United States Patent
Jia et al.

(10) Patent No.: US 9,527,964 B2
(45) Date of Patent: Dec. 27, 2016

(54) THERMOPLASTIC ELASTOMERS CONTAINING AN OLIGOPEPTIDE HARD COMPONENT

(71) Applicants: Li Jia, Hudson, OH (US); Joseph P. Kennedy, Akron, OH (US); Joseph Scavuzzo, Wadsworth, OH (US)

(72) Inventors: Li Jia, Hudson, OH (US); Joseph P. Kennedy, Akron, OH (US); Joseph Scavuzzo, Wadsworth, OH (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 14/396,951

(22) PCT Filed: Apr. 24, 2013

(86) PCT No.: PCT/US2013/037974
§ 371 (c)(1),
(2) Date: Oct. 24, 2014

(87) PCT Pub. No.: WO2013/163286
PCT Pub. Date: Oct. 31, 2013

(65) Prior Publication Data
US 2015/0141574 A1    May 21, 2015

Related U.S. Application Data

(60) Provisional application No. 61/638,186, filed on Apr. 25, 2012.

(30) Foreign Application Priority Data

Apr. 25, 2013 (WO) ................ PCT/US2013/037974

(51) Int. Cl.
| | | |
|---|---|---|
| C08G 77/42 | (2006.01) |
| C08F 10/06 | (2006.01) |
| C08F 10/10 | (2006.01) |
| C08F 12/08 | (2006.01) |
| C08F 22/10 | (2006.01) |
| C08F 36/06 | (2006.01) |
| C08F 36/08 | (2006.01) |
| C08G 77/388 | (2006.01) |
| C08G 81/02 | (2006.01) |
| C08G 69/08 | (2006.01) |
| C08G 69/10 | (2006.01) |

(52) U.S. Cl.
CPC ............. *C08G 77/42* (2013.01); *C08F 10/06* (2013.01); *C08F 10/10* (2013.01); *C08F 12/08* (2013.01); *C08F 22/10* (2013.01); *C08F 36/06* (2013.01); *C08F 36/08* (2013.01); *C08G 77/388* (2013.01); *C08G 81/024* (2013.01); *C08G 69/08* (2013.01); *C08G 69/10* (2013.01)

(58) Field of Classification Search
CPC ....... C08G 69/08; C08G 69/10; C08G 81/024; C08F 10/06; C08F 10/10; C08F 12/08; C08F 22/10; C08F 36/06; C08F 36/08

See application file for complete search history.

(56) References Cited

U.S. PATENT DOCUMENTS

| | | |
|---|---|---|
| 6,994,913 B1 | 2/2006 | Niki et al. |
| 2004/0007792 A1 | 1/2004 | Harreld et al. |
| 2005/0228157 A1 | 10/2005 | Peterson et al. |
| 2010/0267918 A1* | 10/2010 | Kura ...................... C08G 69/10 528/20 |
| 2012/0271003 A1 | 10/2012 | Konig et al. |

FOREIGN PATENT DOCUMENTS

| | | |
|---|---|---|
| CA | 2777662 | 4/2001 |
| WO | 2011/068846 | 6/2011 |

OTHER PUBLICATIONS

Klok, H.A., et al.; Advances in Polymer Science, 2006, p. 75-111.*
Brydson, J.A.; Plastics Materials, 1995, p. 182-200.*
Brzezinska, K.R., et al.; Macromolecules, 2001, p. 4348-4354.*
Ibarboure, E., et al.; Journal of Polymer Science: Part A: Polymer Chemistry, 2006, p. 4668-4679.*
Nakajima, A., et al.; Macromolecules, 1979, p. 840-843.*
Zhou, C., et al.; Biomacromolecules, 2006, p. 2415-2419.*
Sato, et al; Microheterophase structure, permeability, and biocompatibility of A-B-A triblock copolymer membranes composed of poly9gama-ethyl L-glutamate) as the A component and polybutadiene as the B component; 1 page.

* cited by examiner

*Primary Examiner* — Robert Jones, Jr.
(74) *Attorney, Agent, or Firm* — Renner Kenner Grieve Bobak Taylor & Weber

(57) ABSTRACT

The present invention is generally directed to a new class of TPEs made from peptide terminated low $T_g$ polymers and methods for making them. The middle block of these TPE is a telechelic polymer with a $T_g$ that is below the intended service temperature of the TPE. The terminal peptide segments of these TPEs are short (from about 1 to about 10 amino acids long) and tend to from sheet type secondary structures through intermolecular hydrogen bonds, creating physical crosslinks between polymer chains. The dissimilarity of the peptide hard component and the elastomeric soft component results in very strong segregation between the microphase domains and a low plastic deformation for the resulting TPE. And since the $T_m$ of the crystalline peptide phase can be adjusted, these new TPEs may be tailored to fit the intended service temperature and are melt-processable.

20 Claims, 10 Drawing Sheets

Step 1

Step 2

A.

B.

A.

B.

C.

A

B

THERMOPLASTIC ELASTOMERS CONTAINING AN OLIGOPEPTIDE HARD COMPONENT

CROSS REFERENCE TO RELATED APPLICATIONS

This application claims the benefit of U.S. provisional patent application Ser. No. 61/638,186 entitled "Thermoplastic Elastomers Containing an Oligopeptide Hard Component," filed Apr. 25, 2012, which is hereby incorporated by reference in its entirety.

FIELD OF THE INVENTION

The present invention encompasses a new class of thermoplastic elastomer (TPE) comprising a peptide terminated telechelic polymer. The peptide segments are short and tend to form β-sheet-type secondary structures via intermolecular hydrogen bonds thereby bringing about physical crosslinks between the polymer chains. The middle block is a telechelic polymer with a glass-transition temperature ($T_g$) below the intended service temperature of the TPE, as such is known in the art.

BACKGROUND OF THE INVENTION

TPEs are block co-polymers made of a hard component and a soft component. The two components undergo microphase separation. The solid domains formed by the hard component are glassy or crystalline. The solid domains are dispersed within a matrix of the soft component and act as both physical crosslinkers and filler particles. The polymer chains of the soft component have a $T_g$ below the service temperature and are able to stretch but are restricted from flowing. In the absence of the hard component, the soft component can flow. TPE networks can be recycled, and can be prepared by liquid processing technologies.

In conventional TPEs, the molecular weights of the hard and soft components have to reach a relatively high value for effective microphase separation. Even after the above molecular weight requirements are satisfied, there is still a certain degree of mixing in the microdomains. The incomplete segregation often compromises the materials properties causing problems such as plastic deformation. For block copolymer TPEs, where the block responsible for physical crosslink is usually a styrenic block, the service temperature cannot exceed the glass transition temperature of polystyrene ($T_g$=~90° C.), which significantly limits their usefulness.

Accordingly, there is a need in the art for a TPE having "hard" components with adjustable $T_g$'s and/or melting temperature ($T_m$) that are higher than the $T_g$ of the prior art polystyrene components, a high microphase separation tendency, and low plastic deformation.

SUMMARY OF THE INVENTION

The present invention replaces the styrenic blocks in the block copolymer TPEs such as poly(styrene-block-butadiene-block-styrene) and poly(styrene-block-isobutylene-block-styrene) of the prior art with short peptide segments as the hard component. The short peptides form crystalline physical crosslinking domains with adjustable melting temperatures above the $T_g$ of polystyrene, thus expanding the service temperature of the TPEs of the present invention to above that of the conventional styrenic TPEs. Very low plastic deformation is achieved, likely due to the strong segregation of the peptide segments from the low-$T_g$ component.

One embodiment of the present invention encompasses a thermoplastic elastomer composition comprising a telechelic polymer having at least 2 functional ends and a peptide segment bound to each functional end, wherein the telechelic polymer has a $T_g$ at least 20° C. lower than the service temperature of the thermoplastic elastomer composition, wherein the service temperature is from about −40° C. to about 220° C. In some embodiments, the telechelic polymer has at least 3 functional ends. In some embodiments, the telechelic polymer is a star polymer having at least 3 functional ends.

In other embodiments of the present invention, the thermoplastic elastomer composition described above includes a telechelic polymer having two functional ends such that the thermoplastic elastomer composition comprises an A-B-A tri-block copolymer wherein A is a peptide segment and B is an elastomeric polymer. In some embodiments, the A-B-A tri-block copolymer is linear.

In some other embodiments, the thermoplastic elastomer composition of the present invention may include any of the embodiments described above wherein the telechelic polymer has a $T_g$ that is at least 30° C. lower than the service temperature. In some other embodiments, the thermoplastic elastomer composition of the present invention may include any of the embodiments described above wherein the $T_g$ of the telechelic polymer is at least 50° C. lower than the service temperature. In some other embodiments, the thermoplastic elastomer composition of the present invention may include any of the embodiments described above wherein the $T_g$ of the telechelic polymer is at least 70° C. lower than the service temperature. In some other embodiments, the thermoplastic elastomer composition of the present invention may include any of the embodiments described above wherein the $T_g$ of the telechelic polymer is at least 100° C. lower than the service temperature.

In some other embodiments, the thermoplastic elastomer composition of the present invention may include any of the embodiments described above wherein the service temperature is from about −40° C. to about 180° C. In some other embodiments, the thermoplastic elastomer composition of the present invention may include any of the embodiments described above wherein the service temperature is from about −20° C. to about 150° C. In some other embodiments, the thermoplastic elastomer composition of the present invention may include any of the embodiments described above wherein the service temperature is from about 0° C. to about 100° C. In some other embodiments, the thermoplastic elastomer composition of the present invention may include any of the embodiments described above wherein the service temperature is from about 20° C. to about 42° C.

In some other embodiments, the thermoplastic elastomer composition of the present invention may include any of the embodiments described above wherein the telechelic polymer has a $T_g$ of from about −130° C. to about 100° C. In some other embodiments, the thermoplastic elastomer composition of the present invention may include any of the embodiments described iabove wherein the telechelic polymer has a $T_g$ of from about −100° C. to about 50° C. In some other embodiments, the thermoplastic elastomer composition of the present invention may include any of the embodiments described above wherein the telechelic polymer has a $T_g$ of from about −80° C. to about 0° C.

In some other embodiments, the thermoplastic elastomer composition of the present invention includes any of the embodiments described above wherein said peptide segment forms β-sheet or sheet secondary structures.

In some other embodiments, the thermoplastic elastomer composition of the present invention may include any of the embodiments described above wherein B is an elastomeric segment having a $T_g$ of from about −130° C. to about 100° C. In some other embodiments, the thermoplastic elastomer composition of the present invention may include any of the embodiments described above wherein B is an elastomeric segment having a $T_g$ of from about −100° C. to about 50° C. In some other embodiments, the thermoplastic elastomer composition of the present invention may include any of the embodiments described above wherein B is an elastomeric segment having a $T_g$ of from about −80° C. to about 0° C.

In some embodiments, the thermoplastic elastomer composition of the present invention includes any of the embodiments described above and further comprises a plurality of A-B-A tri-block copolymer chains, each of said A-B-A tri-block copolymer chains having two peptide segments and an elastomeric polymer segment, wherein A-B-A tri-block copolymer chains are physically crosslinked by hydrogen bonds formed between peptide segments of said A-B-A tri-block copolymer chains.

In some other embodiments, the thermoplastic elastomer composition of the present invention includes any of the embodiments described above further comprising a plurality of polymer chains, each of said polymer chains having three or more peptide segments and one polymer segment, wherein said polymer chains are physically crosslinked by hydrogen bonds formed between the peptide segments of said polymer chains.

In some other embodiments, the thermoplastic elastomer composition of the present invention includes any of the embodiments described above further comprising a plurality of star polymer chains, each of said star polymer chains having three or more peptide segments and one star polymer segment, wherein said star polymer chains are physically crosslinked by hydrogen bonds formed between the peptide segments of said star polymer chains.

In some embodiments, the thermoplastic elastomer composition of the present invention may include any of the embodiments described above wherein said peptide segments form crystalline domains. In some embodiments, the crystalline domains have a $T_m$ of from about 80° C. to about 260° C. In some embodiments, the thermoplastic elastomer composition of the present invention may include any of the embodiments described above wherein the crystalline domains have a $T_m$ of from about 100° C. to about 240° C. In some embodiments, the thermoplastic elastomer composition of the present invention may include any of the embodiments described above wherein the crystalline domains have a $T_m$ of from about 120° C. to about 220° C.

In some embodiments, the thermoplastic elastomer composition of the present invention may include any of the embodiments described above wherein said peptide segment further comprises two or more amino acid residues selected from the group consisting of alanine, β-alanine, or alanine-glycine, leucine, and isoleucine. In some embodiments, the thermoplastic elastomer composition of the present invention may include any of the embodiments described above wherein the peptide segment comprises two or more β-alanine residues. In some embodiments, the thermoplastic elastomer composition of the present invention may include any of the embodiments described above wherein said peptide segment has from 2-10 amino acid residues. In some embodiments, the thermoplastic elastomer composition of the present invention may include any of the embodiments described above wherein said peptide segment has from 2-6 amino acid residues. In some embodiments, the thermoplastic elastomer composition of the present invention may include any of the embodiments described above wherein said peptide segments are from about 0.1 to about 14 weight percent of the thermoplastic elastomer composition.

In some embodiments, the thermoplastic elastomer composition of the present invention may include any of the embodiments described above wherein the telechelic polymer comprises a polymer selected from the group consisting of polyisobutylene ("PIB"), polyisoprene, polybutadiene ("PBD"), poly(styrene-co-butadiene), poly(dimethylsiloxane), poly(ethylene-co-propylene), hydrogenated polybutadiene, hydrogenated polyisoprene, hydrogenated poly(styrene-co-butadiene), polystyrene, poly(methyl methacrylate), poly(ethyl methacrylate), poly(propyl methacrylate), poly(butyl methacrylate), poly(methyl acrylate), poly(ethyl acrylate), poly(propyl acrylate), poly(butyl acrylate), and any combinations or derivatives thereof. In some embodiments, the thermoplastic elastomer composition of the present invention may include any of the embodiments described above wherein the telechelic polymer comprises polyisobutylene. In some embodiments, the thermoplastic elastomer composition of the present invention may include any of the embodiments described above wherein the telechelic polymer comprises polybutadiene.

Another embodiment of the present invention is directed to a thermoplastic elastomer having the formula:

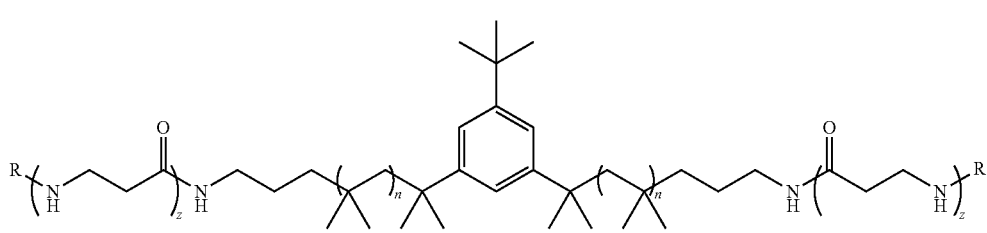

(I)

wherein n is a number average degree of polymerization of from 1 to 20,000; z is an integer from 2 to 10; and R is a hydrogen atom, an organic group, or inorganic group.

Still another embodiment of the present invention is directed to a thermoplastic elastomer having the formula:

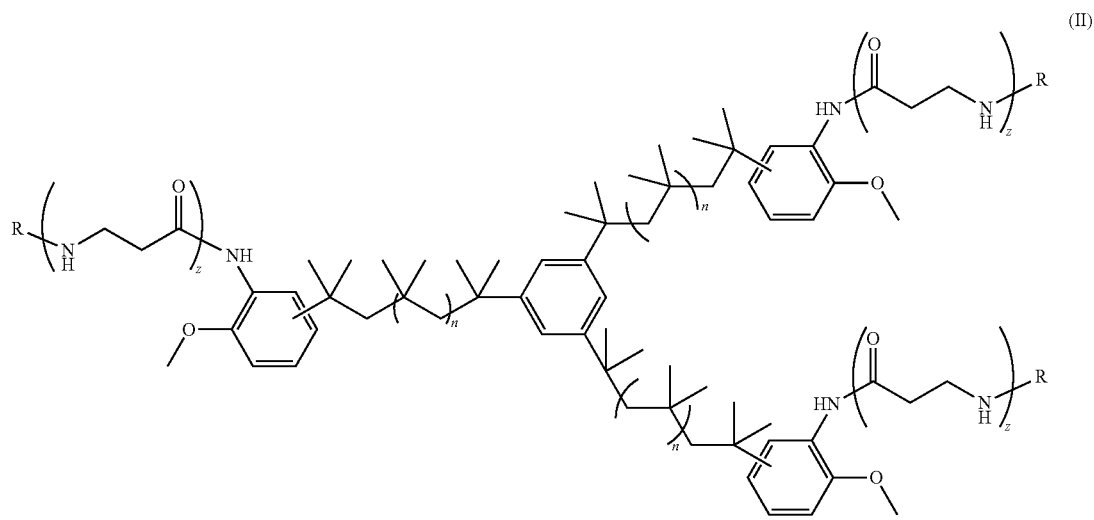

(II)

wherein n is a number average degree of polymerization of from 1 to 20,000; z is an integer from 2 to 10; and R is a hydrogen atom, an organic group, or inorganic group. In some embodiments, the R is a hydrogen atom, an acetyl group or a toluoyl group. In some embodiments, z is an integer selected from 2, 3, 4, 5, and 6.

Yet another embodiment of the present invention is directed to a thermoplastic elastomer having the formula:

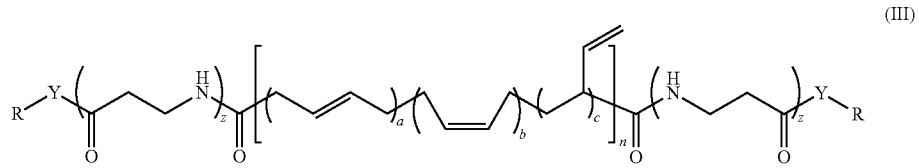

(III)

wherein a, b, and c are the fraction of each isomer of butadiene, each of said isomers comprising from 0% to 100% of a polybutadiene segment such that the total percentage of the isomers is 100% of the polybutadiene segment; n is a number average degree of polymerization of from 1 to 50,000; z is an integer from about 2 to about 10; Y is O or NH; and R is a hydrogen atom, an organic group, or inorganic group. Further, as shown below and in FIG. 1, a is the fraction of the 1,4-trans-butadiene isomer of PBD segment (isomer (i)) and may comprise from 0% to 100% of the polybutadiene segment; b is the fraction of the 1,4-cis-butadiene isomer of PBD isomer (ii)) and may comprise from 0% to 100% of the polybutadiene segment; and c is the fraction of 1,2-butadiene isomer of PBD (isomer (iii)) segment and may comprise from 0% to 100% of the polybutadiene. In some embodiments, R is a hydrogen atom, an alkyl group or an aryl group. In some embodiments, the ratio a:b:c of isomers (i):(ii):(iii) in the polybutadiene is about 4:5:2. In some embodiments, z is an integer from 2 to 6.

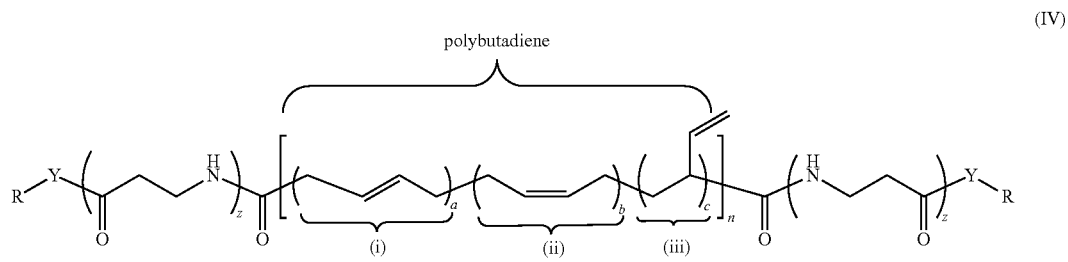

(IV)

In another aspect, present invention encompasses a method for forming a thermoplastic elastomer comprising the steps of: (a) providing a telechelic polymer having at least 2 functional end groups; (b) providing a peptide having from 2 to 10 amino acid residues, wherein one end of said peptide is functionalized to chemically bond to said functional end groups; (c) reacting said telechelic polymer with said peptide wherein said peptide chemically bonds to said functional end groups of said telechelic polymer to form peptide terminated polymer chains; and (d) physically crosslinking said peptide terminated polymer chains wherein said peptide terminated polymer chains are crosslinked by hydrogen bonds formed between a plurality of the peptide segments of different peptide terminated polymer chains.

In yet another aspect, the present invention includes a method for forming a peptide terminated polymer comprising the steps of: (a) providing a telechelic polymer having at least 2 functional end groups; (b) providing a peptide having from 1 to 10 amino acid residues, wherein one end of said peptide is functionalized to chemically bond to said functional end groups; and (c) reacting said telechelic polymer with said peptide wherein said peptide chemically bonds to said functional end groups of said telechelic polymer to form a polymer having terminal peptide segments.

In still another aspect, the present invention is directed to a method for cross linking peptide terminated polymer chains comprising the steps of: (a) providing a telechelic polymer having at least 2 functional end groups; (b) providing a peptide having from 2 to 10 amino acid residues, wherein one end of said peptide is functionalized to chemically bond to said functional end groups; (c) reacting said telechelic polymer with said peptide wherein said peptide chemically bond to said functional end groups of said telechelic polymer to form peptide terminated polymer chains; and (d) precipitating said peptide terminated polymer chains from solution thereby forming physical crosslinks between said peptide terminated polymer chains, wherein said peptide terminated polymer chains are cross-linked by hydrogen bonds formed between a plurality of the peptide segments of different peptide terminated polymer chains.

In some embodiments, the method of the present invention may include any of the embodiments described above, wherein said telechelic polymer has at least 3 functional ends. In some embodiments, the method of the present invention may include any of the embodiments described above, wherein said telechelic polymer is a star polymer having at least 3 functional ends.

In some embodiments, the method of the present invention may include any of the embodiments described above, wherein said functional end groups are amine groups, hydroxyl groups, carboxylic acid groups, or alcohol groups.

In some embodiments, the method of the present invention may include any of the embodiments described above, wherein the peptide segments forms β-sheet or sheet secondary structures.

In some embodiments, the method of the present invention may include any of the embodiments described above, wherein the peptide segments form crystalline domains. In some embodiments, the method of the present invention may include any of the embodiments described above, wherein the crystalline domains have a $T_m$ of from about 80° C. to about 260° C. In some embodiments, the method of the present invention may include any of the embodiments described above, wherein the crystalline domains have a $T_m$ of from about 100° C. to about 240° C. In some embodiments, the method of the present invention may include any of the embodiments described above, wherein the crystalline domains have a $T_m$ of from about 120° C. to about 220° C.

In some embodiments, the method of the present invention may include any of the embodiments described above, wherein the peptide comprises two or more amino acid residues selected from the group consisting of alanine, β-alanine, or alanine-glycine, leucine, and isoleucine. In some embodiments, the method of the present invention may include any of the embodiments described above, wherein the peptide comprises two or more β-alanine amino acid residues. In some embodiments, the method of the present invention may include any of the embodiments described above, wherein the peptide has from 2 to 10 amino acid residues. In some embodiments, the method of the present invention may include any of the embodiments described above, wherein the peptide has from 2-6 amino acid residues.

In some embodiments, the method of the present invention may include any of the embodiments described above, wherein the telechelic polymer has a $T_g$ of from about –130° C. to about 100° C. In some embodiments, the method of the present invention may include any of the embodiments described above, wherein the telechelic polymer has a $T_g$ of from about –100° C. to about 50° C. In some embodiments, the method of the present invention may include any of the embodiments described above, wherein the telechelic polymer has a $T_g$ of from about –80° C. to about 0° C. In some embodiments, the method of the present invention may include any of the embodiments described above, wherein the telechelic polymer has a $T_g$ at least 20° C. lower than the service temperature of the thermoplastic elastomer composition, wherein the service temperature is from about –40° C. to about 220° C.

In some embodiments, the method of the present invention may include any of the embodiments described above, wherein the telechelic polymer has a $T_g$ at least 30° C. lower than the service temperature. In some embodiments, the method of the present invention may include any of the embodiments described above, wherein the telechelic polymer has a $T_g$ at least 50° C. lower than the service temperature. In some embodiments, the method of the present invention may include any of the embodiments described above, wherein the telechelic polymer has a $T_g$ at least 70° C. lower than the service temperature. In some embodiments, the method of the present invention may include any of the embodiments described above, wherein the telechelic polymer has a $T_g$ at least 100° C. lower than the service temperature.

In some embodiments, the method of the present invention may include any of the embodiments described above, wherein the service temperature is from about –40° C. to about 180° C. In some embodiments, the method of the present invention may include any of the embodiments described above, wherein the said service temperature is from about –20° C. to about 150° C. In some embodiments, the method of the present invention may include any of the embodiments described above, wherein the service temperature is from about 0° C. to about 100° C. In some embodiments, the method of the present invention may include any of the embodiments described above, wherein the service temperature is from about 20° C. to about 42° C.

In some embodiments, the method of the present invention may include any of the embodiments described above, wherein the telechelic polymer comprises a polymer selected from the group consisting of polyisobutylene, polyisoprene, polybutadiene, poly(styrene-co-butadiene), poly(dimethylsiloxane), poly(ethylene-co-propylene), hydrogenated polybutadiene, hydrogenated polyisoprene, hydrogenated poly(styrene-co-butadiene), polystyrene, poly(methyl methacrylate), poly(ethyl methacrylate), poly(propyl methacrylate), poly(butyl methacrylate), poly(methyl acrylate), poly(ethyl acrylate), poly(propyl acrylate), poly(butyl acrylate), and any combinations or derivatives thereof. In some embodiments, the method of the present invention may include any of the embodiments described above, wherein the telechelic polymer comprises polyisobutylene. In some embodiments, the method of the present invention may include any of the embodiments described above, wherein the telechelic polymer comprises polybutadiene.

In some embodiments, the method of the present invention may include any of the embodiments described above, wherein the telechelic polymer comprises polyisobutylene, there are two functional end groups, and said functional end groups are amine groups. In some embodiments, the method of the present invention may include any of the embodiments described above, wherein the telechelic polymer comprises polyisobutylene, there are three or more functional end groups, and said functional end groups are amine groups. In some embodiments, the method of the present invention may include any of the embodiments described above, wherein the peptide is a succinimide-activated peptide. In some embodiments, the method of the present invention may include any of the embodiments described above, wherein the telechelic polymer comprises polybutadiene, there are two functional end groups, and said functional end groups are carboxylic acid groups.

In some embodiments, the method of the present invention may include any of the embodiments described above, wherein the telechelic polymer is reacted with said peptide segments by: (i) dissolving a telechelic polyisobutylene polymer having two amine functional end groups in chloroform; (ii) adding said peptide to said dissolved polymer; (iii) adding 1-ethyl-3-(3-dimethylaminopropyl)-carbodiimide; (iv) stirring the reaction mixture until the reaction is substantially complete; and (v) precipitating the peptide terminated polymer into cold methanol.

In some embodiments, the method of the present invention may include any of the embodiments described above, wherein the telechelic polymer is reacted with said peptide by: (i) dissolving a telechelic polyisobutylene star polymer having three or more amine functional end groups in chloroform; (ii) adding a succinimide-activated peptide to said dissolved polymer; (iii) refluxing the mixture until the reaction is substantially complete; and (iv) precipitating the peptide terminated polymer into cold methanol.

In some embodiments, the method of the present invention may include any of the embodiments described above, wherein the telechelic polymer is reacted with said peptide by: (i) dissolving a telechelic polybutadiene polymer having two carboxylic acid functional end groups in chloroform and reacting it with di(N-succinimidyl) carbonate to form a succinimide-activated polybutadiene; (ii) placing said peptide and said succinimide-activated polybutadiene in a container purged with nitrogen and adding chloroform and triethylamine; (iii) refluxing the mixture until the reaction is substantially complete; and (iv) adding a solution of water and methanol to precipitate out the peptide terminated polymer.

In some embodiments, the method of the present invention may include the embodiment described above with the additional the steps of: (e) evaporating of the solvent from the solution containing said peptide terminated polymer chains; and (f) collecting the physically crosslinked polymer chains. In some embodiments, the method of the present invention may include the embodiments described above with the additional the steps of: (g) heating the peptide terminated polymer chains to the $T_m$ of the crystalline domains of the peptide segments or above the $T_m$ of the crystalline domains of the peptide segments and then (h) cooling the peptide terminated polymer chains below the $T_m$ of the crystalline domains of the peptide segments. In some embodiments, the method of the present invention may include the embodiment described above wherein said peptide terminated polymer chains are crosslinked by the crystalline domains formed by a plurality of the peptide segments of different peptide terminated polymer chains.

Yet another embodiment of the present invention is directed to a peptide terminated polymer. In some embodiments, the peptide found in the peptide terminated polymer is a peptide having from 1-10 amino acid residues. Suitable peptides include, but are not limited to, alanine, β-alanine, alanine-glycine, leucine, and isoleucine. In some embodiments, the polymer is elected from the group consisting of polyisobutylene, polyisoprene, polybutadiene, poly(styrene-co-butadiene), poly(dimethylsiloxane), poly(ethylene-co-propylene), hydrogenated polybutadiene, hydrogenated polyisoprene, hydrogenated poly(styrene-co-butadiene), polystyrene, poly(methyl methacrylate), poly(ethyl methacrylate), poly(propyl methacrylate), poly(butyl methacrylate), poly(methyl acrylate), poly(ethyl acrylate), poly(propyl acrylate), poly(butyl acrylate) or any combinations and/or derivatives thereof. In some embodiments, the peptide terminated polymer comprises a peptide terminated polyisobutylene. In some embodiments, the peptide terminated polymer comprises a peptide terminated polybutadiene.

In some embodiments, the peptide terminated polymer of the present invention may include any of the embodiments described above, wherein said peptide is β-alanine.

In some embodiments, the peptide terminated polymer of the present invention may include any of the embodiments described above, wherein said polymer is polyisobutylene. In some embodiments, the peptide terminated polymer of the present invention may include any of the embodiments described above, wherein said polymer is polybutadiene.

In some embodiments, the peptide terminated polymer of the present invention may include any of the embodiments described above wherein said polymer does not contain any peptides or amino acids in any location except at the ends of the chains.

BRIEF DESCRIPTION OF THE DRAWINGS

For a more complete understanding of the features and advantages of the present invention, reference is now made to the detailed description of the invention along with the accompanying figures in which:

FIG. 13A is a TEM image showing the fibrous morphology of the oligo(β-alanine) microphase domains in a specimen formed by dripping one drop of 0.1 w % of chloroform solution of polymer P6 on a TEM grid and blotting away the excessive liquid. FIG. 13B is a TEM image of a dilute specimen after the specimen prepared as the above was dipped into clean chloroform a few times to dissolve away some of polymer P6.

DETAILED DESCRIPTION OF THE ILLUSTRATIVE EMBODIMENTS

Figure 1:
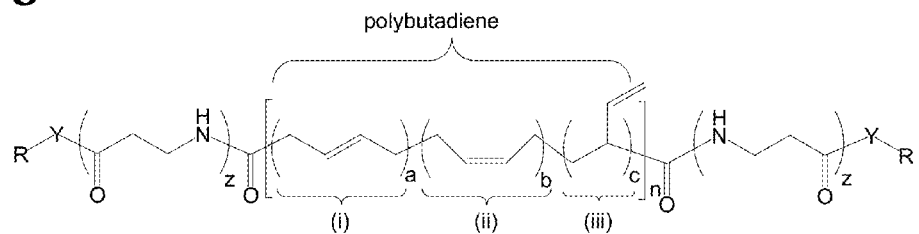
FIG. 1 is a general formula for a TPE according to one embodiment of the present invention identifying the 1,4-trans-butadiene, 1,4-cis-butadiene, and 1,2-butadiene isomers of that may comprise the polybutatiene segment of the TPE.

The present invention is generally directed to a new class of TPEs made from peptide terminated low $T_g$ polymers and methods for making them. The terminal peptide segments of these TPEs are short (from about 1 to about 10 amino acids long) and tend to from β-sheet or sheet type secondary structures through intermolecular hydrogen bonds thereby creating physical crosslinks between polymer chains. As with many existing conventional TPEs, the middle block of these TPE is a polymer with a $T_g$ that is below the intended service temperature of the TPE. It is believed that the dissimilarity of the peptide hard component and the elastomeric soft component results in strong segregation between the microphase domains and that the strong segregation results in low plastic deformation.

As set forth above, the $T_g$ of the polymer should be below the intended service temperature for the TPE. And since the $T_m$ of the crystalline peptide phase can be adjusted by varying the number of amino acid residues in the peptide segment and/or the capping group at the end of the peptide segment, these new TPEs may be tailored to fit the intended service temperature. Moreover, a substantial window between the $T_m$ and the decomposition temperature ($T_d$) of the peptide segment can exist, making the TPEs of the present invention melt-processable.

In some embodiments, the telechelic polymer has a $T_g$ at least 20° C. lower than the service temperature of the thermoplastic elastomer composition, wherein the service temperature is from about −40° C. to about 220° C. In some embodiments, the service temperature may be from about −40° C. to about 180° C. In some embodiments, the said service temperature may be from about −20° C. to about 150° C. In some embodiments, the service temperature may be from about 0° C. to about 100° C. In some embodiments, the service temperature may be from about 20° C. to about 42° C.

In some embodiments, the telechelic polymer has a $T_g$ at least 30° C. lower than the service temperature. In some embodiments the telechelic polymer has a $T_g$ at least 50° C. lower than the service temperature. In some embodiments, the telechelic polymer has a $T_g$ at least 70° C. lower than the service temperature. In some embodiments, the telechelic polymer has a $T_g$ at least 100° C. lower than the service temperature.

The middle polymer block may be any telechelic polymer with a $T_g$ lower than the intended service temperature of the TPE. In some embodiments, the telechelic polymer has a $T_g$ of from about −130° C. to about 100° C. In some embodiments, the telechelic polymer has a $T_g$ of from about −100° C. to about 50° C. In some embodiments, the telechelic polymer has a $T_g$ of from about −80° C. to about 0° C.

The elastomeric polymer should be telechelic but may have any architecture, including, but not limited to a linear, branched, grafted or star architecture. (See e.g., FIGS. 2, 3, and 4). The telechelic polymer may have any number of functional end groups, but should have at least 2. In some embodiments, the telechelic polymer has at least 3 functional ends. In some embodiments, the telechelic polymer is a star polymer having at least 3 functional ends. In other embodiments of the present invention, the telechelic polymer has two functional ends. In this case, the thermoplastic elastomer composition will take the form of an A-B-A tri-block copolymer, wherein A is a peptide segment and B is an elastomeric polymer. In some embodiments, the A-B-A tri-block copolymer is linear. (See FIGS. 2 and 4).

Suitable polymers will have a relatively low $T_g$ and may include, but are not limited to, polyisobutylene, polyisoprene, polybutadiene, poly(styrene-co-butadiene), poly(dimethylsiloxane), poly(ethylene-co-propylene), hydrogenated polybutadiene, hydrogenated polyisoprene, hydrogenated poly(styrene-co-butadiene), polystyrene, poly (methyl methacrylate), poly(ethyl methacrylate), poly(propyl methacrylate), poly(butyl methacrylate), poly(methyl acrylate), poly(ethyl acrylate), poly(propyl acrylate), poly (butyl acrylate), or any combinations and/or derivatives thereof. In some embodiments, the polymer comprises polyisobutylene. In some other embodiments, the polymer comprises polybutadiene.

The polymer precursor for the middle block in the novel TPE of the present invention is telechelic with functional end groups that can be used to couple the polymer precursor with the peptide segment or "A" block, such as an amine group, a hydroxyl group, a carboxylic acid group, or another end group derived from carboxylic acid. The term telechelic (from the Greek telos=far, and chelos=claw) means that each and every terminus of a polymer molecule is fitted with a functional end group. Suitable telechelic polymers are often commercially available. For example, the telechelic polybutadiene having carboxylic acid end groups described herein are commercially available from Emerald Performance Materials of Akron, Ohio. For an additional example, some of the telechelic poly(dimethylsiloxane)s with primary amine end groups described herein are commercially available from the Sigma-Aldrich Corporation of St. Louis, Mo.

In some embodiments, the low-$T_g$ polymers used to form the TPEs of the present invention are linear telechelic polyisobutylenes having telechelic primary amine end groups as shown in the formula below:

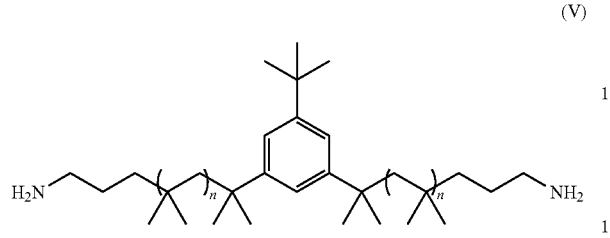

(V)

wherein n represents a number average degree of polymerization for the TPE and is a number from about 1 to about 20,000. In some embodiments, n may be from about 200 to about 1000. In some embodiments, telechelic polyisobutylenes with telechelic primary amine end groups are prepared in the manner set forth in US 2010-0130696 A1, the disclosure of which is hereby incorporated by reference in its entirety.

In some embodiments, the low-$T_g$ polymers used to form the TPEs of the present invention are star shaped telechelic polyisobutylenes having telechelic primary amine end groups as shown in the formula below:

5,840,814, U.S. Pat. No. 6,512,056, and/or U.S. Pat. No. 5,395,885 the disclosures of which are incorporated herein by reference in their entirety. Further, while the star shaped PIB (VI) shown above, has aromatic amine terminal end groups, it should be understood that the PIB chains may also have aliphatic amine terminal end groups. In some embodiments, the star shaped PIB may have carboxylic acid end groups or other end groups derived from carboxylic acids.

In some embodiments, the low-$T_g$ polymers used to form the TPEs of the present invention are telechelic PBDs with telechelic carboxylic acid end groups having the general formula:

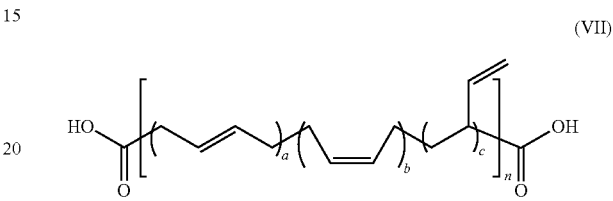

(VII)

where n represents the number average degree of polymerization for the PBD segment of the TPE and is a number from about 1 to about 50,000. In some embodiments, n may be from about 50 to about 2000. The variables a, b, and c are the number fraction of units of 1,4-trans-butadiene (isomer

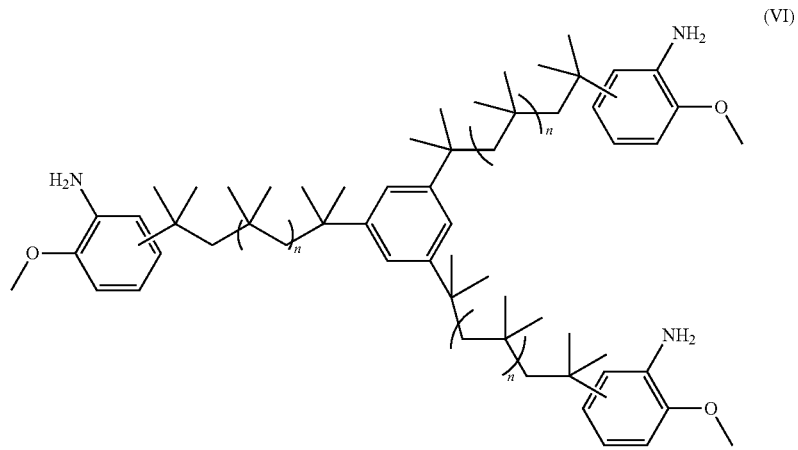

(VI)

where n represents the number average degree of polymerization for a PIB segment and is a number from about 1 to about 50,000. In some embodiments, n may be from about 50 to about 2000.

The star shaped PIB shown above has three arms, each one having a amine functional end group. Star shaped PIB polymers having more that three arms are well known in the art and it should be understood that star shaped telechelic PIB having more than 3 functional end group (1 per arm) are also possible and may be used. It should also be understood that the star shaped PIB polymers may be formed by any means known in the art, including, but not limited to carbocationic polymerization as shown in U.S. Pat. No.

(i)), 1,4-cis-butadiene (isomer (i)), and 1,2-butadiene (isomer (i))) isomers of butadiene that may comprise the PBD segment of the TPE. (See FIG. 1). The fraction of each butadiene isomers (a, b, and c) may also be expressed in terms of the percentage of each isomer in the PBD segment wherein each isomers may be present in an amount from 0% to 100%. That is, the PBD may be made up of one, two, or three isomers of butadiene in any number ratio so long as the total of the isomer fractions a+b+c is 1 or 100%. In some embodiments, the unit ratio of the isomers (i):(ii):(iii) is about 4:5:2. The variable z represents a number of amino acid residues in each one of the two peptide segments and is an integer from about 2 to about 10 and is preferably from 2 to 6. In some embodiments, z is an integer from 2 to 5.

The amino acids selected for use in the short peptide segments of the TPE of the present invention tend to form multiple hydrogen bonds with neighboring peptide segments to form β-sheets or sheet secondary structures of the type described in *J. Poly. Sci. Part A*-2 1970, 8, 1703, the disclosure of which is incorporated herein by reference in its entirety. Some suitable amino acids include, but are not limited to alanine, β-alanine, glycine, leucine, and isoleucine. In some embodiments, the peptide segment of the TPE of the present invention is an oligo(alanine). In some embodiments, the peptide segment of the TPE of the present invention may be an oligo (alanine-glycine). In some other embodiments, the peptide segment of the TPE of the present invention may be an oligo(β-alanine). The peptide segments may be synthesized stepwise using standard solution-phase procedures for coupling amino acids known in the art or other known and unknown methods. (See e.g. Example 2, below)

The peptides used to form the TPEs of the present invention are relatively short, having from 2 to 10 amino acid residues. In some embodiments, the peptides have from 2 to 6 amino acid residues. In some embodiments, the peptides have from 2 to 5 amino acid residues.

It is intended that the peptides to bind only to the functional end groups of the telechelic polymer, and not become incorporated into other parts of the telechelic polymer. To prevent this, one end of the peptide may be "capped" to prevent it from reacting with the polymer. Capping moities are well known in the art and may be any organic or inorganic substance capable of bonding to one end of the peptide and not binding with the telechelic polymer. Selection of capping groups is generally well understood in the art, but the selection will depend, among other things, upon such factors as the particular peptide used, the particular polymer used, the end of the peptide to be reacted to the functional end groups of the polymer, and the identity of the functional end group. Suitable capping groups may include, for example, an acetyl group, an m-toluoyl group, an isobutyl amido group, or a hydrogen atom. In some embodiments, the capping group is an acetyl group. In some embodiments, the capping group is an m-toluoyl group. In some embodiments, the capping group is a hydrogen atom. In some embodiments, the capping group is an isobutyl amido group.

It is the other (non-capped) end of the peptide that bonds to the functional end groups of the telechelic polymer to form the TPEs of of the present invention. It should be appreciated that depending upon the particular functional end groups used and which end of the peptide is the (non-capped) free end of the of the peptide, it is sometimes necessary to functionalize or activate the (non-capped) free end of the peptide so that it can be attached to the functional end groups of the polymer used. It should also be appreciated that depending upon the particular way in which the (non-capped) free end of the of the peptide is functionalize or activated, it is sometimes necessary to functionalize or activate the functional end groups of the polymer used in order for the peptide and the polymer to be coupled with each other.

The peptide may be activated by any method known in the art. In some embodiments, the peptide may be activated by reacting it with a succimidal carbonate. In some embodiments, the peptide may be activated by reacting it with a carbodiimides. In some embodiments, the peptide may be activated as set forth in Example 3.

The novel TPEs according to the present invention are made by attaching the peptides discussed above to the functional end groups located at the end of each polymer chain of the low-$T_g$ telechelic polymer described above. One of ordinary skill in the art will know how to attach the peptides to the primary amine end groups of the polyisobutylene by amidation. One of ordinary skill in the art will also know how to attach the peptides to the carboxylic acid end groups of the polybutadiene by amidation.

In some embodiments, the peptides may be attached to the primary amine end groups of a telechelic polyisobutylene, such as (V) above, by amidation as follows. (See FIG. 5). First, the carboxylic acid terminus of the oligo(β-alanine) is activated by 1-ethyl-3-(3-dimethylaminopropyl)carbodiimide (EDC) in situ. Then, the amine end groups of the telechelic polyisobutylene react with the in situ activated oligo(β-alanine) to give a TPE with the following formula:

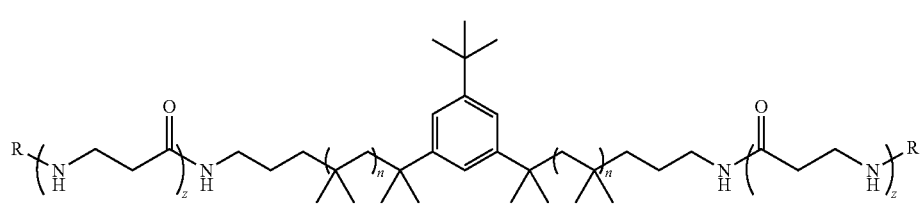

Figure 5:
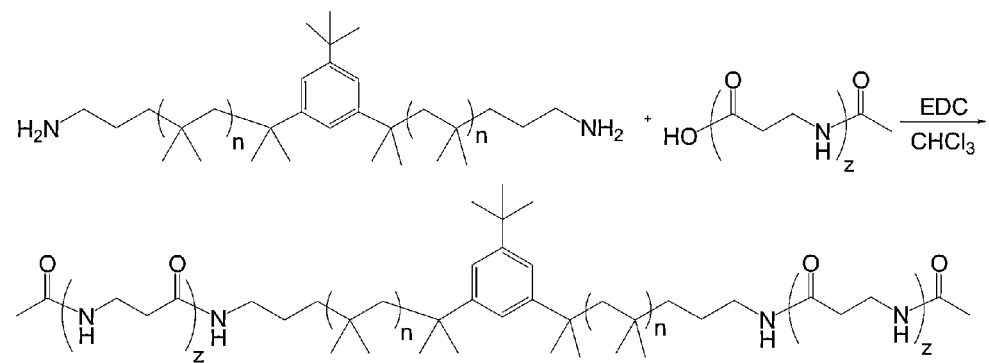
FIG. 5 is a reaction scheme for forming a linear peptide terminated polyisobutylene according to one embodiment of the present invention.

(I)

wherein n is the number average degree of polymerization from about 10 to about 20,000; z is the number of amino acid residues and is an integer from about 1 to about 10, preferably from 2 to 6; and R is a hydrogen atom, an organic group, or an inorganic group. (See FIG. 2). In some embodiments, n may be from 100 to 2000. In some embodiments, R is an acetyl or m-toluoyl group. In some embodiments, z is an integer from 2 to 5. In some embodiments, the telechelic polymer may be amidated as shown in FIG. 5.

In some embodiments, the peptides may be attached to the primary amine end groups of a star shaped telechelic polyisobutylene, such as (VI) above, by amidation as follows. (See FIG. 6). First, the carboxylic acid terminus of the oligo(β-alanine) is activated by 1-ethyl-3-(3-dimethylaminopropyl)carbodiimide (EDC) in situ. Then, the amine end groups of the telechelic polyisobutylene react with the in situ activated oligo(β-alanine) to give a TPE with the following formula:

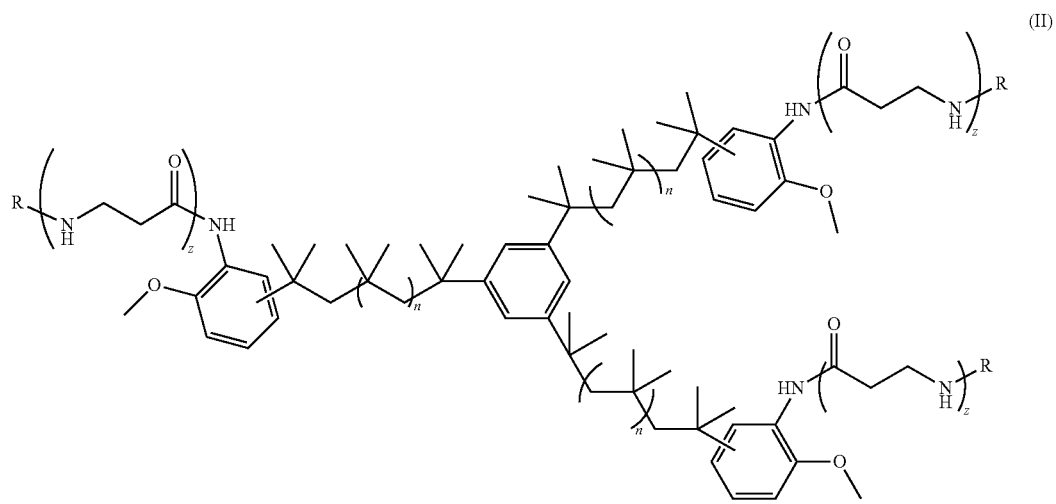

Figure 6:
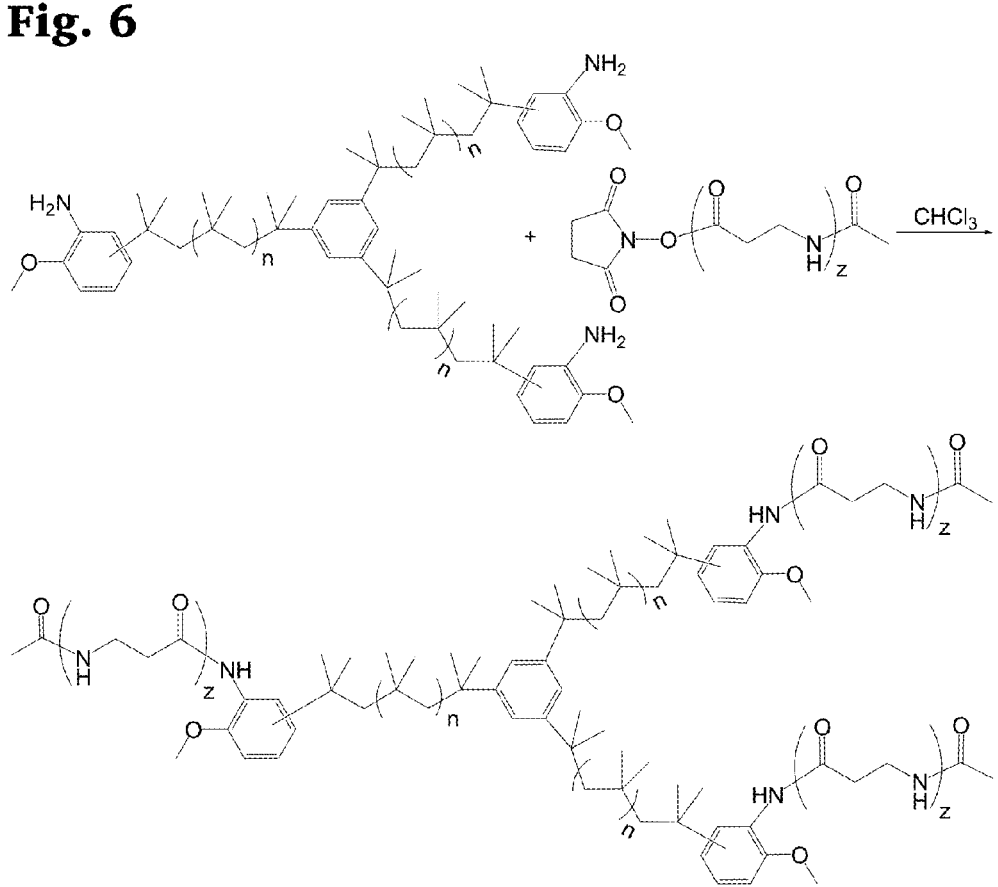
FIG. 6 is a reaction scheme for forming a star shaped peptide terminated polyisobutylene according to one embodiment of the present invention.

(II)

wherein n is the number average degree of polymerization of the elastomeric segment of the TPE and is a number from about 10 to about 20,000 and z is the number of amino acid residues in the peptide segments of the TPE and is an integer from about 1 to about 10, preferably from 2 to 6. (See FIG. 3). In some embodiments, n may be from about 50 to about 2000. In some embodiments, z is an integer from 2 to 5. R may be a hydrogen atom, an organic group, or an inorganic group. In some embodiments, the R groups are m-toluoyl or acetyl groups. In one embodiment, the telechelic star polymer having three or more functional end groups may be amidated as shown in FIG. 6.

In other embodiments, a telechelic polybutadiene with telechelic carboxylic acid end groups, such as (VI) shown above, may be amidated as follows. (See FIG. 7). First, the carboxylic acid end groups of the polybutadiene are transformed to give the succinimidyl ester (See FIG. 7, step 1, FIG. 8) having the following structure:

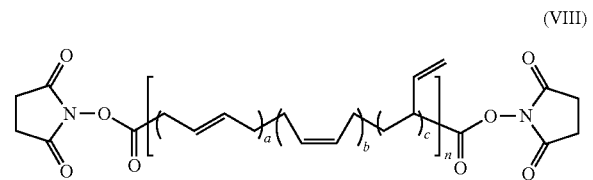

(VIII)

Figure 7:
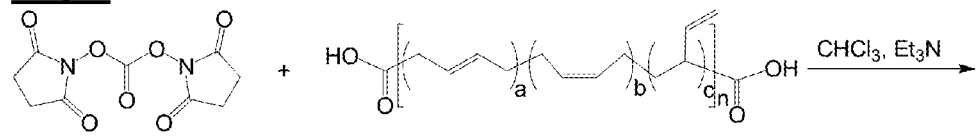
FIG. 7 is a reaction scheme for forming a peptide terminated polybutadiene according to one embodiment of the present invention.
Figure 7:
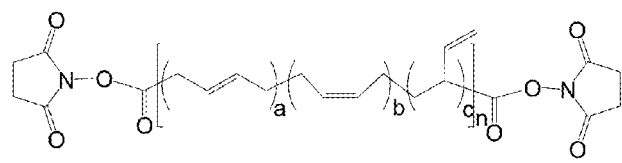
Figure 7:
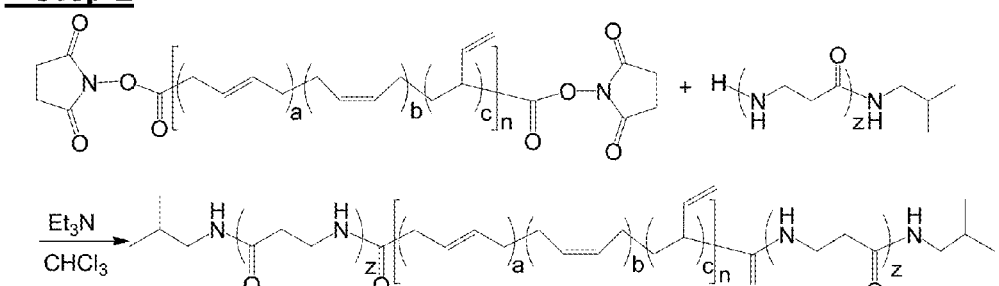
Figure 8:
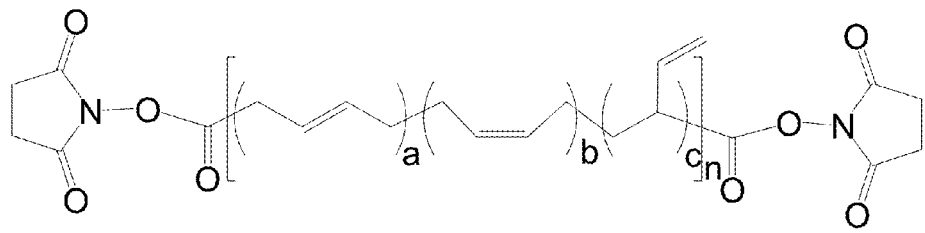
FIG. 8 is a formula for a succinimide-activated polybutadiene intermediary generated and used in the preparation of a TPE according to one embodiment of the present invention.

Next, the succinimide-activated PBD is reacted with the oligo(β-alanine)s to form the following TPE (See FIG. 7, step 2).

and c are the number fractions of the 1,4-trans-butadiene (isomer (i)), 1,4-cis-butadiene (isomer (ii)), and 1,2-butadiene (isomer (iii)) isomer units that may comprise the PBD segment of the TPE. (See FIG. 1). As set forth above, the isomer ratio may also be expressed in terms of a percentage wherein each of the isomers may be present in the PBD in an amount from 0% to 100%. That is, the PBD may be made up of one, two, or three isomers of butadiene in any ratio so long as the total isomer fraction (a+b+c) is 1 or 100%. In some embodiments, the ratio or a:b:c is about 4:5:2. The variable z represents the number of amino acid residues in each one of the peptide segments and may be an integer from about 1 to about 10, preferably from 2 to 6. In some embodiments, z is an integer from 2 to 5. Y is O or NH. R is a hydrogen atom, an organic group, or an inorganic group. (See FIG. 4). In some embodiments, R is an isobutyl group. (See FIGS. 1 and 4). In one embodiment, telechelic polybutadienes with telechelic carboxylic acid end groups may be amidated as shown in FIG. 7.

The TPEs of the present invention having a linear molecular architecture and will ordinarily have number average molecular weights from about 1000 to about 500,000 and those having a branched or star morphology will ordinarily have number average molecular weights from about 3000 to about 1,000,000. In some embodiments, the TPEs of the present invention have a linear morphology (See e.g., FIGS. 2, 4) and number average molecular weights of about 50,000. In some embodiments, the TPEs of the present invention have a branched or star morphology and number average molecular weights of about 80,000.

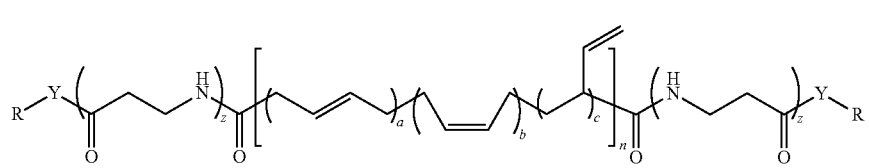

(III)

As used herein, n represents the number average degree of polymerization for the PBD segment of the TPE and is a number from about 10 to about 50,000. The variables a, b, Further, as set forth above, it is believed that the peptide segments (or "A" block) in the TPEs of the present invention have a high tendency of segregating from the low-$T_g$ middle block and form crystalline microphase domains within the TPE. The IR spectra for the TPEs according to the present invention having the oligo(β-alanine) segments display (FIG. 9) an N—H stretching vibration at <3300 cm$^{-1}$ indicating that hydrogen bonding of the amide functionalities plays an important role in the physical crosslinking of the polymer chains in the TPE. Further, the amide I and amide II bands are consistent with the formation of a sheet-like structure. No oligo(β-alanine) mixed with the low-$T_g$ soft component is detectable by IR. Therefore, it is believed that the oligo(β-alanine) exists exclusively in the crystalline microphase. It is further believed that the strong segregation between the hard and soft component results in low plastic deformation, a highly desirable attribute for TPEs. (See FIGS. 10-12 and Table 1, below).

Figure 2:
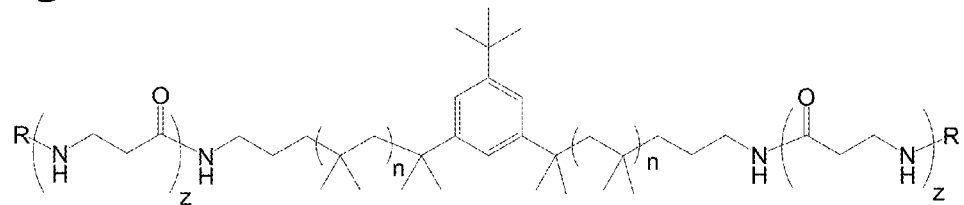
FIG. 2 is a general formula for a peptide terminated polyisobutylene having linear architecture and prepared according to one embodiment of the present invention.
Figure 3:
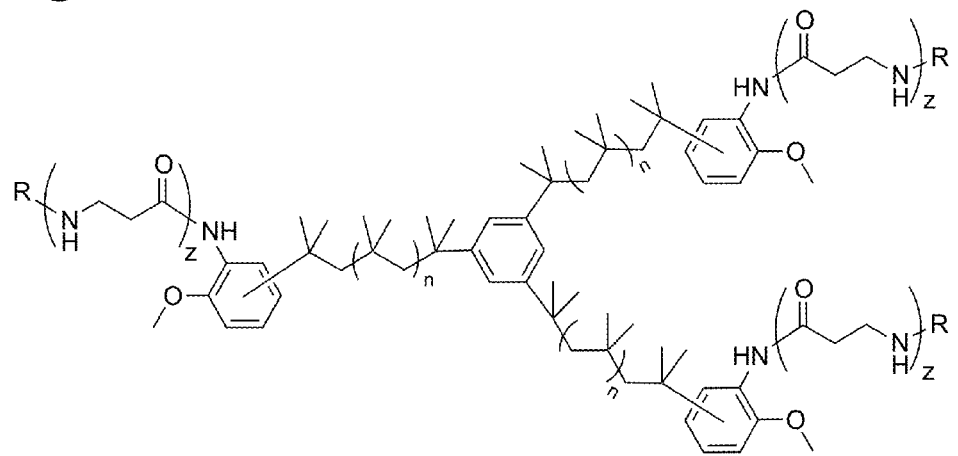
FIG. 3 is a general formula for a peptide terminated polyisobutylene having a star architecture and prepared according to one embodiment of the present invention.
Figure 4:
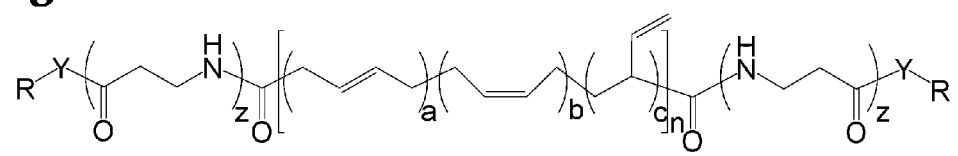
FIG. 4 is a general formula for a peptide terminated polybutadiene having linear architecture and prepared according to one embodiment of the present invention.

Furthermore, the melting temperature of the peptide domains in the TPEs according to the present invention is adjustable from about 86° C. to about 238° C. depending upon the number of amino acid residues in the peptide (z) and the particular R groups capping the peptide in the TPE (See FIGS. 2-4). It has been found that melting temperatures of the TPE increase as a function of the number z. (See Table 1, below).

Figure 10:
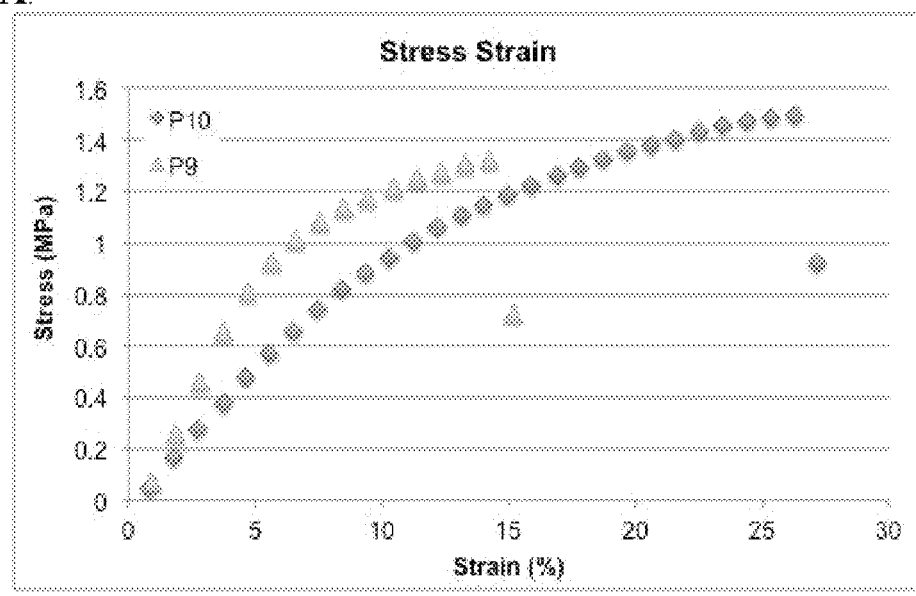
FIG. 10A is a graph of the results of a stress/strain analysis conducted at room temperature on sample TPEs (P9 and P10), prepared according to various embodiments of the present invention.
FIG. 10B is a graph of the results of a stress/strain analysis conducted at room temperature on sample TPEs (P5, P6, and P7), prepared according to various embodiments of the present invention.
Figure 10:
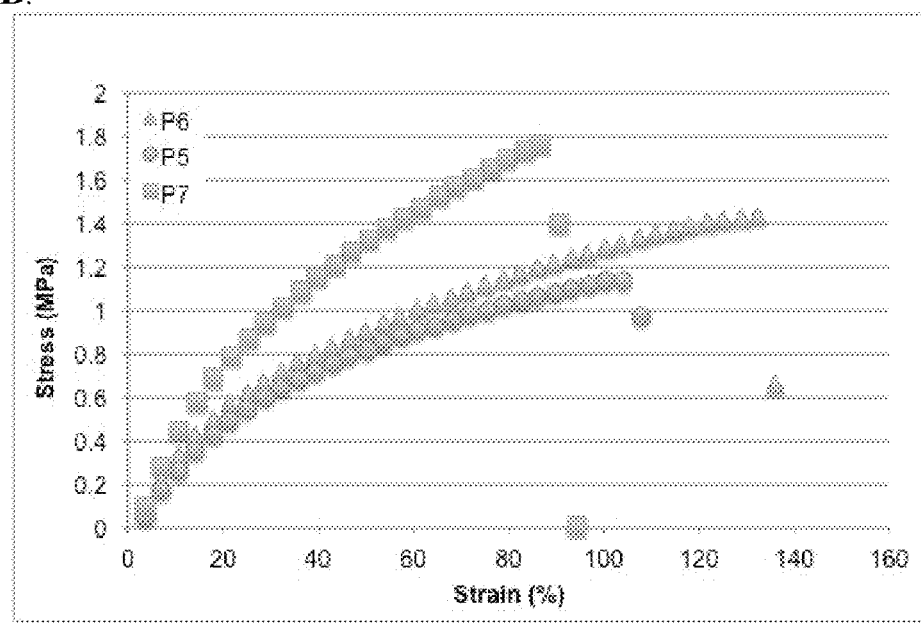
Figure 12:
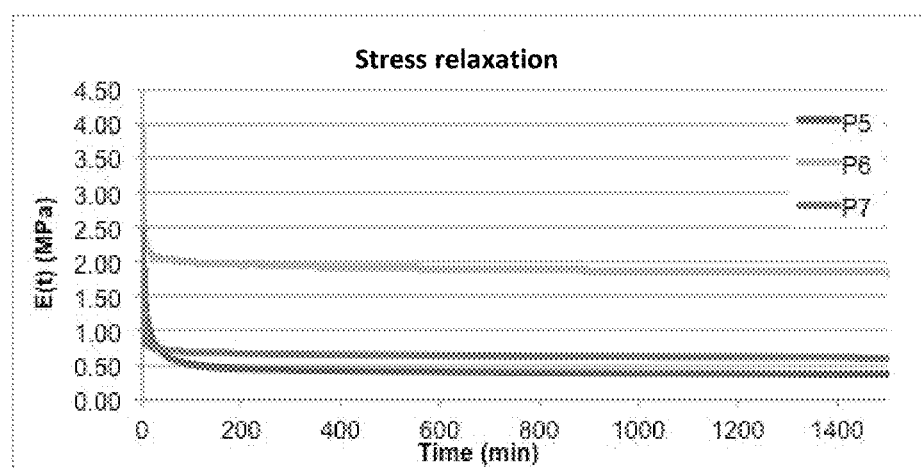
FIG. 12 is a graph showing the results of stress relaxation studies performed on sample TPEs (P5, P6, and P7) prepared according to various embodiments of the present invention.
Figure 13:
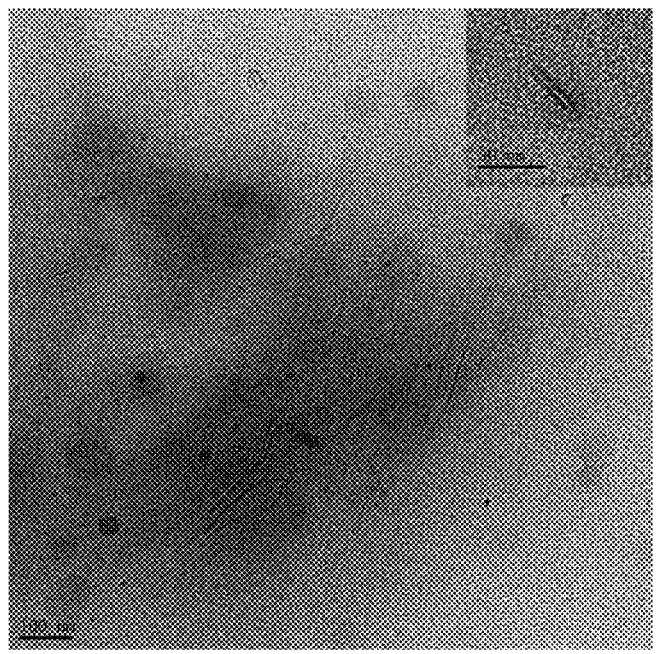
FIG. 13 is two transmission electron micrograph (TEM) images of a TPE according to the present invention.
Figure 13:
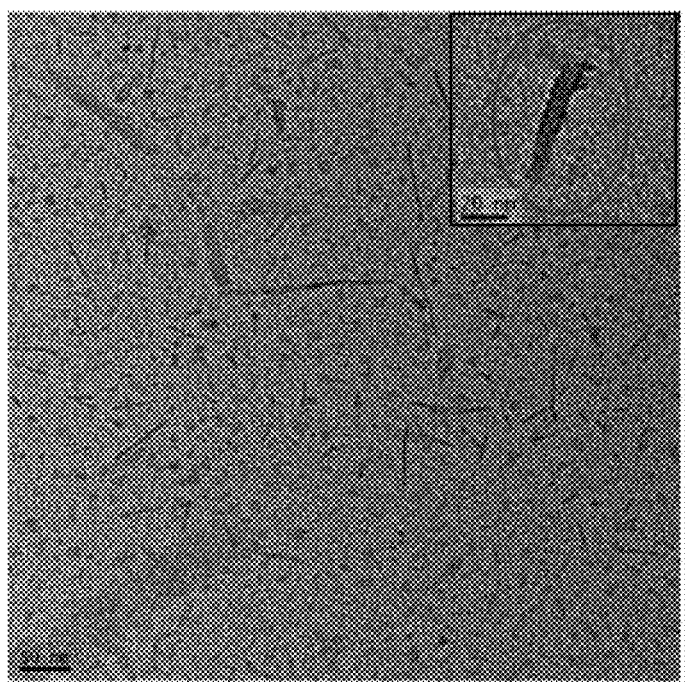

It has also been found that the TPEs of the present invention obtain effective microphase separation and thus physical crosslinking with as few as two amino acid residues forming the peptide segments in the TPE. (Table 1). The peptide segments generally comprise from about 0.1% to about 14% of the TPE by weight. (See Table 1). Stress strain curves for TPEs of the present invention indicate substantial moduli are achieved with as little as 2.5 wt % of the peptide. (FIG. 10). This is in sharp contrast to conventional TPEs, where several tens of percent of a hard component such as polystyrene, is required to achieve similar moduli. Dynamic mechanical behaviors of these TPEs at room temperature are typical for elastomeric solids (See FIG. 11). Stress relaxation experiments show the TPEs to have low plastic deformation. (See FIG. 12). A transmission electron microscopic study of a TPE according to the present invention (P6) suggests that the microphase domains of the oligo(β-alanine) are fibrous. (See FIG. 13). The fibrils are several to 10 nanometers in width and several tens and hundreds nanometers in length. (See FIG. 13)

In another aspect, the present invention also comprises a method for forming a thermoplastic elastomer comprising the steps of: (a) providing a telechelic polymer having at least 2 functional end groups; (b) providing a peptide having from 2 to 10 amino acid residues, wherein one end of said peptide is functionalized to chemically bond to said functional end groups; (c) reacting said telechelic polymer with said peptide wherein said peptide chemically bonds to said functional end groups of said telechelic polymer to form peptide terminated polymer chains; and (d) physically crosslinking said peptide terminated polymer chains wherein said peptide terminated polymer chains are crosslinked by hydrogen bonds formed between a plurality of the peptide segments of different peptide terminated polymer chains.

In yet another aspect, the present invention comprises a method for forming a peptide terminated polymer comprising the steps of: (a) providing a telechelic polymer having at least 2 functional end groups; (b) providing a peptide having from 1 to 10 amino acid residues, wherein one end of said peptide is functionalized to chemically bond to said functional end groups; and (c) reacting said telechelic polymer with said peptide wherein said peptide chemically bonds to said functional end groups of said telechelic polymer to form a polymer having terminal peptide segments.

In still another aspect, the present invention includes a method for physically crosslinking polymer chains comprising the steps of: (a) providing a telechelic polymer having at least 2 functional end groups; (b) providing a peptide having from 2 to 10 amino acid residues, wherein one end of said peptide is functionalized to chemically bond to said functional end groups; (c) reacting said telechelic polymer with said peptide wherein said peptide chemically bond to said functional end groups of said telechelic polymer to form peptide terminated polymer chains; and (d) precipitating said peptide terminated polymer chains from solution thereby forming physical crosslinks between said peptide terminated polymer chains, wherein said peptide terminated polymer chains are crosslinked by hydrogen bonds formed between a plurality of the peptide segments of different peptide terminated polymer chains.

In some embodiments, the method for physically crosslinking polymer chains may further include the steps of: (e) evaporating of the solvent from the solution containing said peptide terminated polymer chains; and (f) collecting the physically cross linked polymer chains. In some embodiments, the method may further comprising the steps of: (g) heating the peptide terminated polymer chains to the $T_m$ of the crystalline domains of the peptide segments or above the $T_m$ of the crystalline domains of the peptide segments and then (h) cooling the peptide terminated polymer chain below the $T_m$ of the crystalline domains of the peptide segments. In some embodiments, the peptide terminated polymer chains are crosslinked by the crystalline domains formed by a plurality of the peptide segments of different peptide terminated polymer chains.

In another aspect, the telechelic polymer comprises polyisobutylene, there are two functional end groups, and said functional end groups are amine groups. In these embodiments the telechelic polymer may be reacted with the peptide segments by: (i) dissolving the polymer in chloroform; (ii) adding said peptide to said dissolved polymer; (iii) adding 1-ethyl-3-(3-dimethylaminopropyl)carbodiimide; (iv) stirring the reaction mixture until the reaction is substantially complete; and (v) precipitating the peptide terminated polymer into cold methanol.

In some embodiments, the telechelic polymer comprises polyisobutylene, there are three or more functional end groups, and said functional end groups are amine groups, and the peptide is a succinimide-activated peptide. In these embodiments, the telechelic polymer may be reacted with said peptide by: (i) dissolving the telechelic polymer in chloroform; (ii) adding a succinimide-activated peptide to said dissolved polymer; (iii) refluxing the mixture until the reaction is substantially complete; and (iv) precipitating the peptide terminated polymer into cold methanol.

In some embodiments the telechelic polymer comprises polybutadiene, there are two functional end groups, and said functional end groups are carboxylic acid groups. In these embodiments, the telechelic polymer is reacted with said peptide by: (i) dissolving the telechelic polymer in chloroform and reacting it with di(N-succinimidyl) carbonate to form a succinimide-activated polybutadiene; (ii) placing said peptide and said succinimide-activated polybutadiene in a container purged with nitrogen and adding chloroform and triethyl amine; (iii) refluxing the mixture until the reaction is substantially complete; and (iv) adding a solution of water and methanol to precipitate out the peptide terminated polymer.

In light of the foregoing, it should be appreciated that the present invention significantly advances the art by providing a thermoplastic elastomers containing a peptide hard component that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

The following examples are offered to more fully illustrate the invention, but are not to be construed as limiting the scope thereof. Further, while some of examples may include conclusions about the way the invention may function, the inventor do not intend to be bound by those conclusions, but put them forth only as possible explanations. Moreover, unless noted by use of past tense, presentation of an example does not imply that an experiment or procedure was, or was not, conducted, or that results were, or were not actually obtained. Efforts have been made to ensure accuracy with respect to numbers used (e.g., amounts, temperature), but some experimental errors and deviations may be present. Unless indicated otherwise, pressure is at or near atmospheric.

Example 1

Synthesis of Primary Amine-Terminated Polyisobutylene (PIB-(CH$_2$)$_3$—NH$_2$)

Synthesis of an amine-terminated polyisobutylene (PIB-(CH$_2$)$_3$—NH$_2$) is carried out according to the reaction scheme shown below:

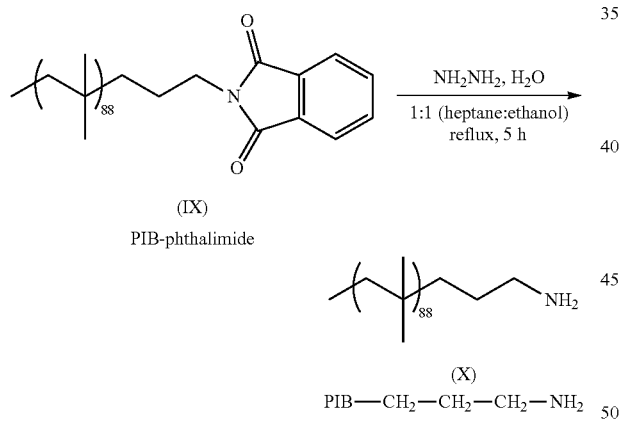

To 1.0 gram of PIB-(CH$_2$)$_3$-phthalimide dissolved in a mixture of 20 mL heptane and 20 mL of ethanol is added 3 grams of hydrazine hydrate. This mixture is then refluxed at 105° C. for 5 hours. Then the charge is diluted with 50 mL hexanes and washed 3 times with excess water. The organic layer is separated, washed three times with distilled water and dried over MgSO$_4$. The hexanes are removed by a rotavap and the polymer is dried under vacuum. The yield of PIB-(CH$_2$)$_3$—NH$_2$ is 0.96 grams.

Example 2

Synthesis of Oligo(β-Alanine)s

The oligo(β-alanine)s were synthesized following a stepwise method starting from β-alanine. First, tBoc-protection of the N-terminus of β-alanine was carried out according to the reaction scheme shown below:

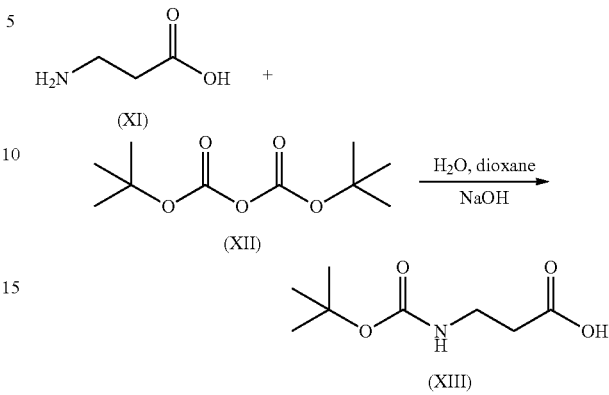

A basic 1:1 solution of water (250 mL) and dioxane (250 mL) was prepared with NaOH (16 g, 400 mmol) in an ice bath. After the NaOH was totally dissolved, β-alanine (35.6 g, 400 mmol) was added followed by the dropwise addition of di-tert-butyl pyrocarbonate (96.0 g, 440 mmol). After the di-tert-butyl pyrocarbonate was added, the solution was removed from the ice bath and allowed to stir at room temperature overnight. The solution was then pumped down to approximately 200 mL and was acidified to pH=2 with concentrated hydrochloric acid. The aqueous solution was extracted with ethyl acetate (100 mL×3). The organic layers were combined, washed once with deionized water (30 mL), and then dried on Na$_2$SO$_4$. The solution was pumped down to dryness and gave a white power. Yield: 68.1, 90% (See, J. Chem. Soc., Perkin Trans. 2, 2002 1177-186, the disclosure of which is incorporated herein by reference in its entirety.)

Benzyl protection of the C-terminus of β-alanine was carried out according to the reaction scheme shown below:

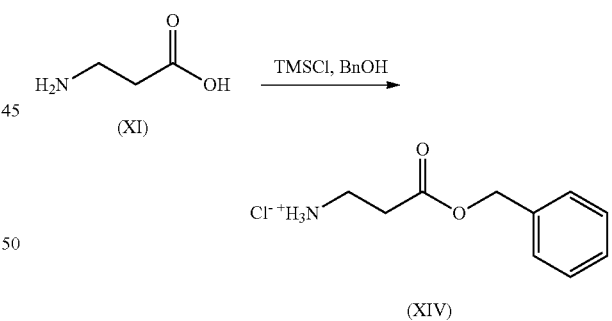

β-Alanine (50 g, 56 mmol) was dissolved in benzyl alcohol (300 mL) in a 3-neck flask. The flask was then flushed with nitrogen, and chlorotrimethylsilane (98.6 g, 786 mmol) was slowly dripped in via an addition funnel. The solution was then heated to 100° C. overnight. The product was isolated by precipitation with diethyl ether (1.5 L) as a white powder. Yield: 108.3 g, 90% (See T. W. Green, P. G. M. Wuts, Protective Groups in Organic Synthesis, Wiley-Interscience, New York, 1999, 372-381, 415-419, 728-731, the disclosure of which is incorporated herein by reference in its entirety.)

Coupling of the above tBoc-protected β-alanine and benzyl-protected β-alanine was carried out according to the reaction scheme shown below:

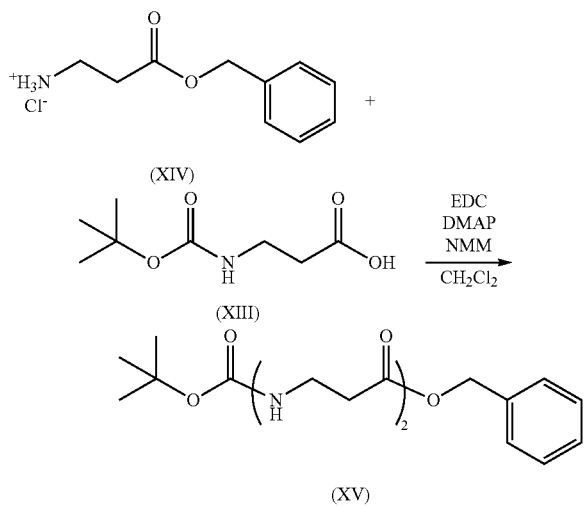

(XIV)

(XIII)

EDC
DMAP
NMM
CH₂Cl₂

(XV)

A solution of N-methylmophyline (NMM) (8.82 g, 87.2 mmol) and the above benzyl-protected β-alanine (17.09 g 79.3 mmol) was prepared in anhydrous dichloromethane (150 mL). Next, the above tBoc-protected β-alanine (15.0 g, 79.3 mmol) was added to the solution as a solid. Last, EDC (22.8 g, 118.9 mmol) and 4-(N,N-dimethylamino)pyridine (DMAP) (0.96 g, 7.9 mmol) were added. After it was stirred for 5 hours, the reaction mixture was washed with a 10 wt % aqueous citric acid solution (50 mL) and a 5 wt % sodium bicarbonate solution (50 mL). The organic layer was dried over sodium sulfate, and the solvent was removed under reduced pressure to give a white powder. Yield: 25.0 g, 90% (See Tetrahedron 61 (2005) 10827-10852, the disclosure of which is incorporated herein by reference in its entirety.)

The benzyl protective group of the above β-alanine dimer was removed from the C-terminus according to the following reaction scheme:

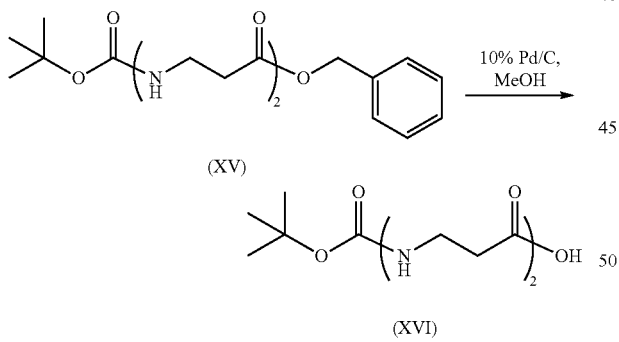

(XV)

10% Pd/C, MeOH (XVI)

The β-alanine dimer (14.0 g, 40 mmol) was dissolved in MeOH (40 mL), and 10 wt % Pd/C (1.40 g) catalyst was added to the solution. Hydrogen gas was bubbled through the solution for 4 hours. The solution was then filtered to remove the Pd/C and the solvent was removed in vacu to yield a white powder. Yield: 9.3 g, 95% (See T. W. Green, P. G. M. Wuts, Protective Groups in Organic Synthesis, Wiley-Interscience, New York, 1999, 372-381, 415-419, 728-731, the disclosure of which is incorporated herein by reference in its entirety.)

The tBoc protective group of the above β-alanine dimer was removed from the N-terminus according to the following reaction scheme:

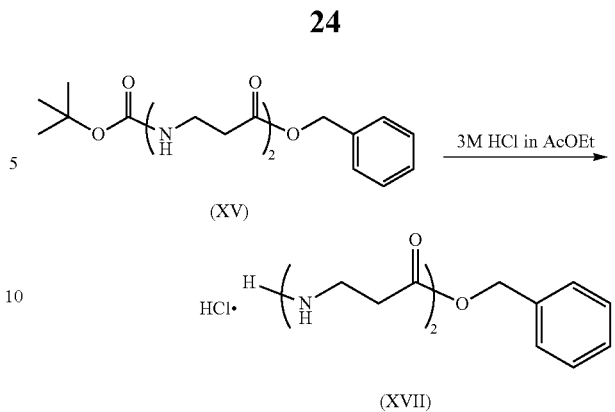

(XV)

3M HCl in AcOEt (XVII)

The β-alanine dimer (14.01 g, 40 mmol) was dissolved in 3M HCl in ethyl acetate (30 mL) and stirred for three hours. The ethyl acetate was removed in vacu to give a white powder. Yield: 9.6 g, 90% (See, T. W. Green, P. G. M. Wuts, Protective Groups in Organic Synthesis, Wiley-Interscience, New York, 1999, 372-381, 415-419, 728-731, the disclosure of which is incorporated herein by reference in its entirety.)

The β-alanine trimer, tetramer, and pentamer referenced below (and used in P5, P6, and P7) were synthesized by repeating the above coupling and deprotection procedures.

Capping of the C-terminus of the above β-alanine dimer was carried out according to the following reaction scheme:

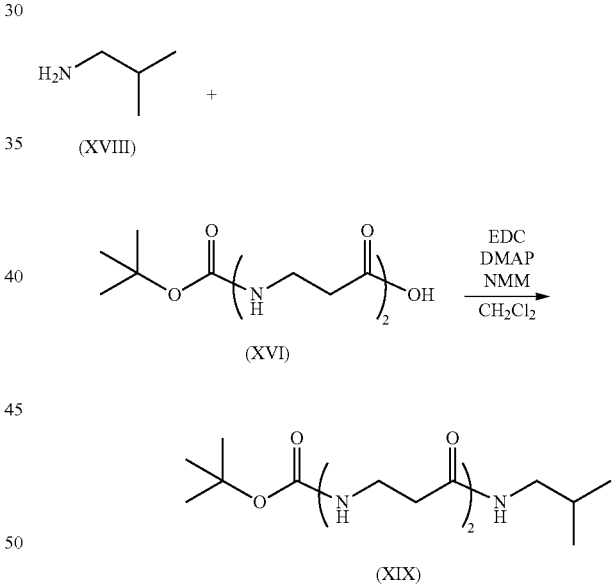

(XVIII)

(XVI)

EDC
DMAP
NMM
CH₂Cl₂

(XIX)

Isobutylamine (5.80 g, 79.3 mmol) was dissolved in anhydrous dichloromethane (500 mL). The above tBoc-protected β-alanine dimmer (20.6 g, 79.3 mmol) was added into the solution as a solid. Last, EDC (22.8 g, 118.9 mmol) and DMAP (0.96 g, 7.9 mmol) were added. After it was stirred for 5 hours, the reaction mixture was washed with a 10 wt % aqueous citric acid solution (100 mL) and a 5 wt % sodium bicarbonate solution (50 mL). The organic layer was dried over sodium sulfate, and the solvent was removed under reduced pressure to give a white powder. Yield: 22.5 g, 90%.

Capping of the N-terminus of the β-alanine dimer was carried out according to the following reaction scheme:

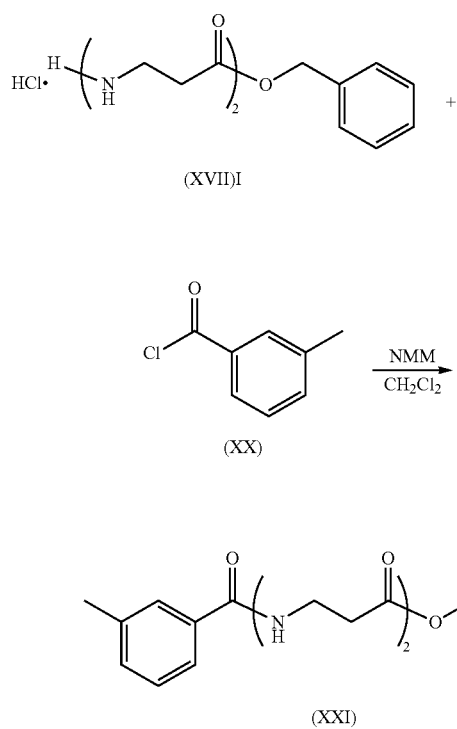

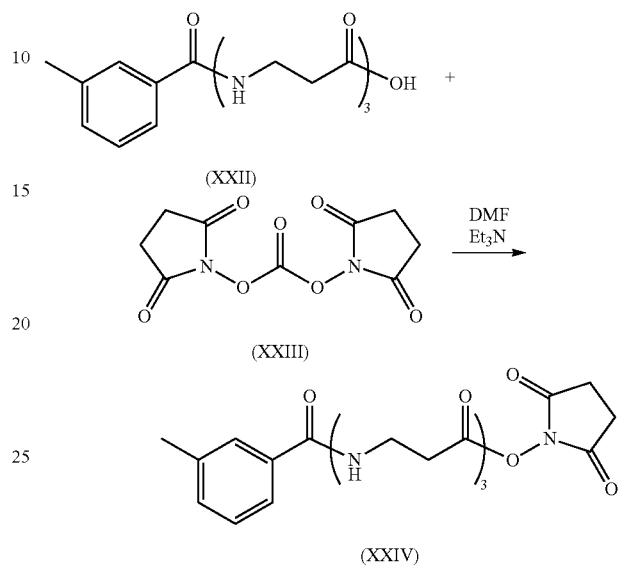

Example 3

Synthesis of Succinimide-Activated Peptide

A succinimide-activated β-alanine trimer was synthesized according to the following scheme:

m-Toluoyl chloride (12.3 g, 79.3 mmol) was dissolved in anhydrous chloroform (500 mL). The above benzyl-protected β-alanine dimer (27.1 g, 79.3 mmol) was added into the solution as a solid. Et₃N (8.81 g, 87.2 mmol) was then added. After it was stirred for 5 h, the reaction mixture was washed with a 10 wt % aqueous citric acid solution (100 mL) and a 5 wt % sodium bicarbonate solution (50 mL). The organic layer was dried over sodium sulfate, and the solvent was removed under reduced pressure to give a white powder. Yield: 26.3 g, 90%.

Capping of the C-terminus and N-terminus of the β-alanine trimer and tetramer was carried out following the same procedure as the above for the dimer except the β-alanine trimer and tetramer were used to begin with.

The peptide (1.0 g, 2.86 mmol), and di(N-succinimidyl) carbonate (0.88 g, 3.43 mmol) was added to a flask and purged with N₂. Anhydrous DMF (10 mL) was added followed by triethylamine (2.0 mL, 14.3 mmol). After 30 min of stirring, the reaction is poured into vigorously stirred diethyl ether (200 mL) to afford a white suspension. The white solid is collected after filtration and dried under reduced pressure. Yield: 1.15 g, 90%

Example 4

Synthesis of Succinimide-Activated Polybutadiene (SuO-PBD-OSu)

Succinimide-activated polybutadiene (SuO-PBD-OSu) (FIG. 8) was synthesized according to the following scheme:

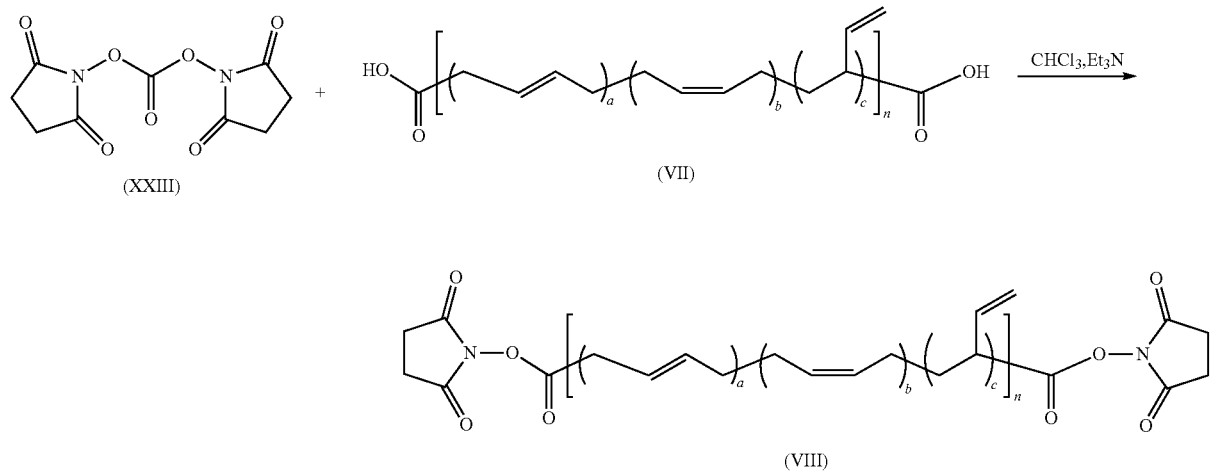

Commercially available carboxylic acid terminated PBD (5.0 g, 0.91 mmol) (Emerald Performance Materials, Akron, Ohio) was dissolved in anhydrous $CHCl_3$ (20 mL). To the above solution were added triethyl amine (1.0 g, 10 mmol) and di(N-succinimidyl) carbonate (0.58 g, 2.28 mmol). After stirring at room temperature for 3 hours, the solvent was removed under reduced pressure and the polymer was extracted from the crude mixture with toluene (20 mL). Toluene was then removed under reduced pressure to give a viscous liquid. Yield: 4.69 g, 90%.

Example 5

Synthesis of Example TPEs (P1-P7)

Example TPE P1 was synthesized according to the scheme shown below:

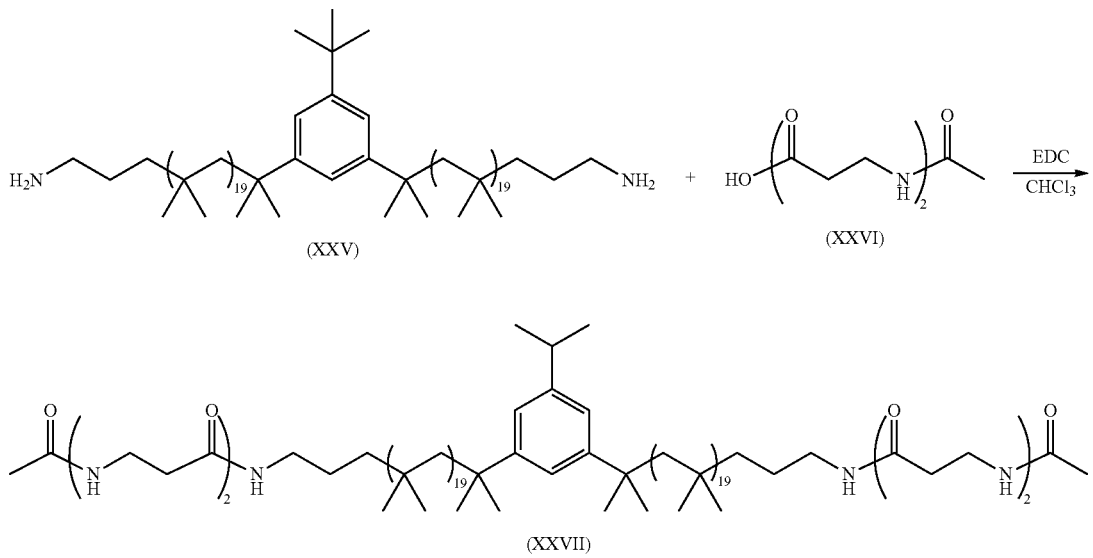

The telechelic PIB with amine end groups (5.0 g, 2.17 mmol) was dissolved in anhydrous $CHCl_3$ (15 mL). The peptide (0.92 g, 4.56 mmol) was then added to solution followed by addition of EDC (1.25 g, 6.50 mmol). The reaction mixture was stirred for 18 h at room temperature and was then precipitated into cold methanol (150 mL) to give a white solid polymer. Yield: 5.23 g, 90%.

Example TPE P2 was produced using the same procedure as P1, except that the telechelic PIB polymer used had a number average molecular $M_n$ of about 8,800.

Example TPE P3 was synthesized according to the scheme shown below:

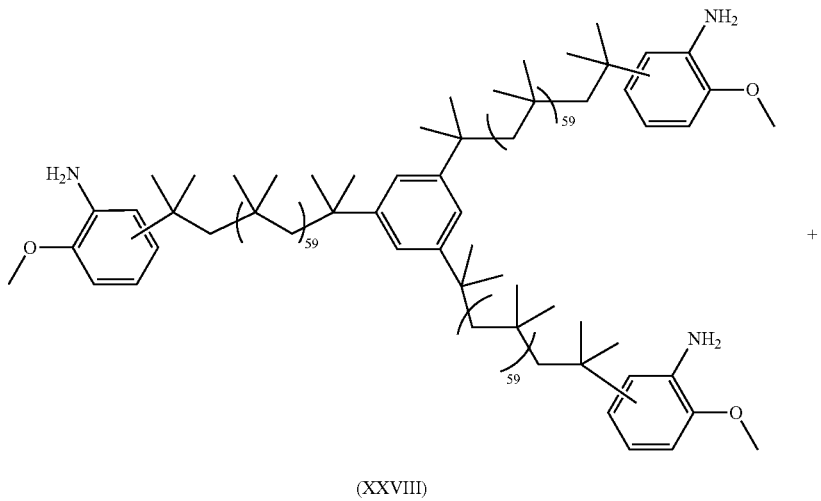

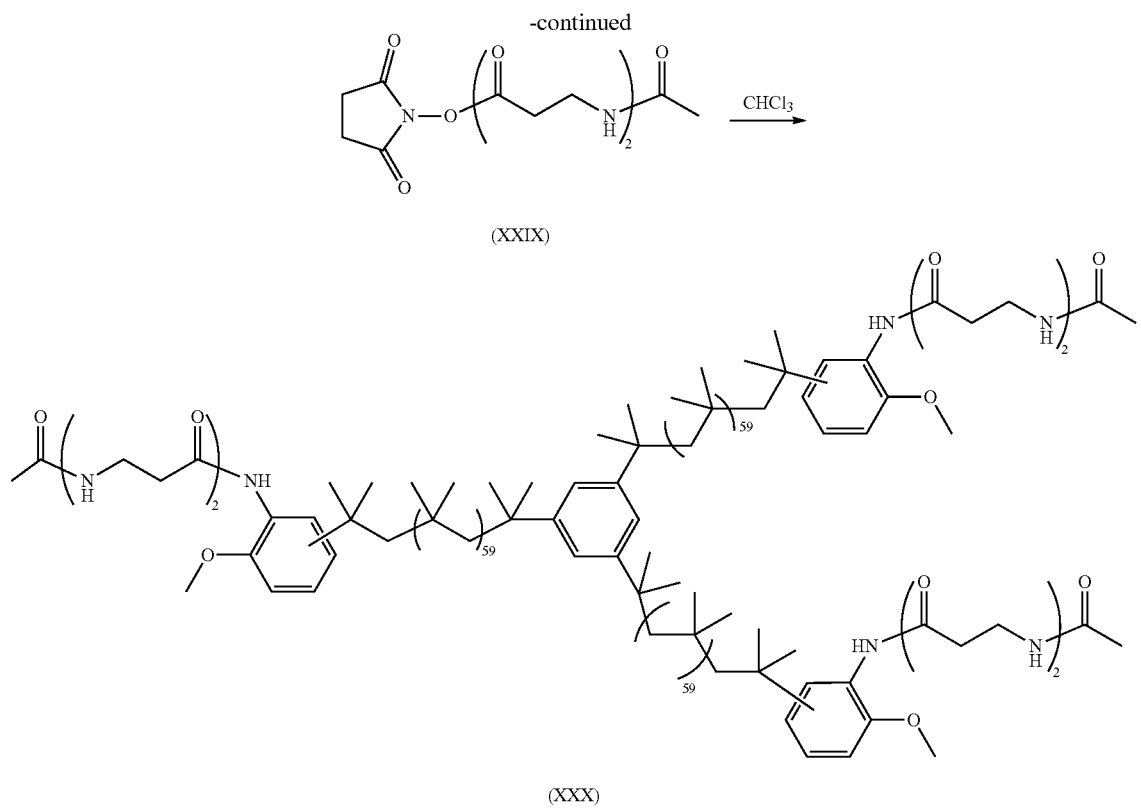

(XXIX)

(XXX)

The 3-arm star telechelic PIB (5.0 g, 0.5 mmol) was dissolved in anhydrous $CHCl_3$ (15 mL). The succinimide-activated peptide (0.46 g 1.55 mmol) was then added to the solution. After the reaction solution was refluxed for 60 h, the solution was poured into cold methanol (150 mL) to precipitate a white solid polymer. Yield: 5.24 g, 90%. (See also, FIGS. 3 and 6).

Example TPE P4 was produced following the same method used for P3, except that the telechelic PIB 3-arm star polymer used had a number average molecular $M_n$ of about 29,000. (See FIGS. 3, 6 and Table 1, below). Example TPE P5 was produced following the same method used for P4, except that the succinimide-activated peptide had three β-alanine amino acid residues (rather than 2 as in P3 and P4). Sample TPE P6 was produced following the same method used for P4, except that the succinimide-activated peptide had four β-alanine amino acid residues (rather than 2 as in P3 and P4 or 3 as in P5). Example TPE P7 was produced following the same method used for P4, except that the succinimide-activated peptide had five β-alanine amino acid residues (rather than 2 as in P3 and P4, 3 as in P5, or 4 as in P6). The identities of Example TPEs P1-P7 are set forth in Table 1, below.

Example 6

Synthesis of Example TPEs (P8-P10)

Example TPE P8 was synthesized according to the scheme shown below:

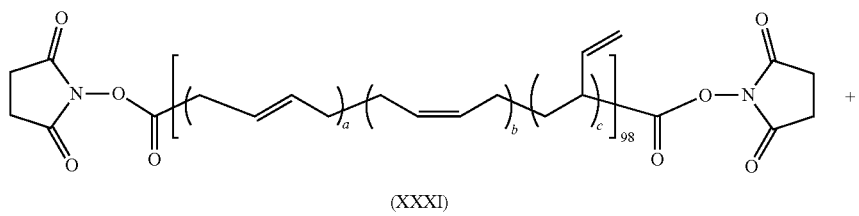

(XXXI)

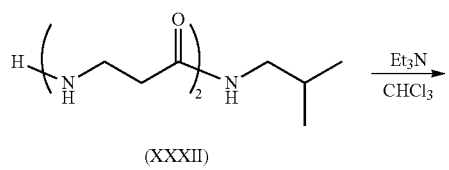

(XXXII)

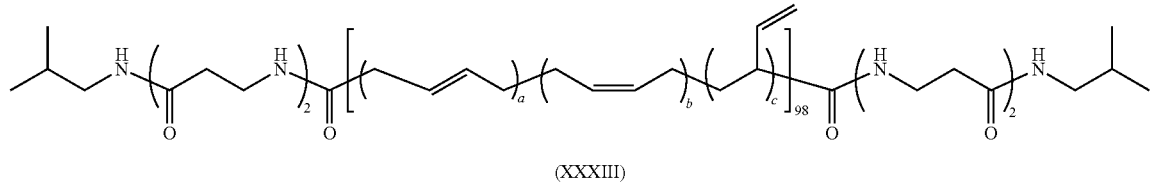

(XXXIII)

The succinimide-activated PBD (5.0 g, 0.91 mmol) and peptide (0.50 g, 2.00 mmol) were loaded in a flask and purged with nitrogen. Chloroform (75 mL) and triethylamine (1.02 mL, 7.21 mmol) were then added to the flask. The solution was refluxed for 60 h. The resulting solution is dripped into a 1:1 mixture of methanol and water (750 mL) to produce a white solid. Yield: 5.00 g, 90%.

Example TPEs P9 and P10 were synthesized using the same procedure used for Example TPE P8, except that the peptide used in Example TPE P9 had three β-alanine amino acid residues and the peptide used in Example TPE P10 had four β-alanine amino acid residues, rather than the two β-alanine amino acid residues as in Example TPE P8. The identities of Example TPEs P8-P10 are shown in Table 1, below.

Example 7

Characterization of Example TPEs (P1-P10) Made According to the Present Invention The identities of P1-P7 as well as P8-P10 are outlined in Table 1

TABLE 1

| Polymer | Middle block | $M_n$ of middle block ($10^3$) | Architecture of middle block | Amino acid in peptide | z | Peptide wt % | Cap (R) |
|---|---|---|---|---|---|---|---|
| P1 | PIB | 2.3 | linear | β-alanine | 2 | 14 | acetyl |
| P2 | PIB | 8.8 | linear | β-alanine | 2 | 4 | acetyl |
| P3 | PIB | 10 | 3-arm star | β-alanine | 2 | 5 | acetyl |
| P4 | PIB | 29 | 3-arm star | β-alanine | 2 | 1 | acetyl |
| P5 | PIB | 29 | 3-arm star | β-alanine | 3 | 2.5 | m-toluoyl |
| P6 | PIB | 29 | 3-arm star | β-alanine | 4 | 3 | m-toluoyl |
| P7 | PIB | 29 | 3-arm star | β-alanine | 5 | 3.5 | m-toluoyl |
| P8 | PBD | 5.5 | linear | β-alanine | 2 | 3.7 | isobutyl |
| P9 | PBD | 5.5 | linear | β-alanine | 3 | 5 | isobutyl |
| P10 | PBD | 5.5 | linear | β-alanine | 4 | 6 | isobutyl |

The TPEs (P1-P10) synthesized in Examples 4 and 5 were characterized by $^1$H NMR as follows: P1 $^1$H NMR (300 MHz, CDCl3) δ 7.15 (3H, s), 3.42-3.57 (8H, m), 3.18-3.21 (4H, q), 2.32-2.42 (8H, m), 1.96 (6H, s), 1.39 (82H, s), 1.08 (246H, s); P2 $^1$H NMR (300 MHz, CDCl3) δ 7.15 (3H, s), 3.42-3.57 (8H, m), 3.18-3.21 (4H, q), 2.32-2.42 (8H, m), 1.96 (6H, s), 1.39 (314H, s), 1.08 (942H, s); P3 $^1$H NMR (300 MHz, CDCl3) δ 8.36 (1H, s), 8.13-8.20 (1H, m), 8.16-8.25 (1H, m), 7.11 (3H, s), 3.86 (9H, s), 3.84 (9H, s), 3.42-3.65 (20H, m), 2.62 (6H, q), 2.38 (6H, q), 1.94 (9H, s), 1.83 (6H, s), 1.80 (9H, s), 1.78 (9H, s), 1.39 (357H, s), 1.08 (1071H, s); P4 $^1$H NMR (500 MHz, CDCl3) δ 8.36 (1H, s), 8.13-8.20 (1H, m), 8.16-8.25 (1H, m), 7.11 (3H, s), 3.86 (9H, s), 3.84 (9H, s), 3.42-3.65 (20H, m), 2.62 (6H, q), 2.38 (6H, q), 1.94 (9H, s), 1.83 (6H, s), 1.80 (9H, s), 1.78 (9H, s), 1.39 (1035H, s), 1.08 (3107H, s); P5 $^1$H NMR (500 MHz, CDCl3) δ 8.36 (1H, s), 8.13-8.20 (1H, m), 8.16-8.25 (1H, m), 7.11 (3H, s), 3.86 (9H, s), 3.84 (9H, s), 3.65-3.73 (6H, m), 3.44-3.61 (12H, m), 2.54-2.71 (12H, m), 2.41-2.51 (6H, m), 2.36 (9H, s), 1.83 (6H, s), 1.80 (9H, s), 1.78 (9H, s), 1.39 (1035H, s), 1.08 (3107H, s); P6 $^1$H NMR (500 MHz, CDCl3) δ 8.36 (1H, s), 8.13-8.20 (1H, m), 8.16-8.25 (1H, m), 7.11 (3H, s), 3.85 (9H, s), 3.83 (9H, s), 3.67-3.76 (6H, m), 3.42-3.64 (18H, m), 2.58-2.67 (6H, m), 2.42-2.51 (6H, m), 2.36 (9H, s), 2.23-2.32 (12H, m), 1.83 (6 H, s), 1.80 (9H, s), 1.78 (9H, s), 1.39 (1035H, s), 1.08 (3107H, s); P7 $^1$H NMR (500 MHz, CDCl3, TFA-d3) δ 7.88 (1H, s), 7.73-7.77 (1H, m), 7.47-7.53 (1H, m), 7.11 (3H, s), 3.85 (9H, s), 3.83 (9H, s), 3.71-3.80 (6H, m), 3.40-3.68 (24H, m), 2.83-2.71 (6H, m), 2.45-2.63 (24H, m), 2.36 (9H, s), 2.23-2.32 (12H, m), 1.83 (6H, s), 1.82 (9H, s), 1.78 (9H, s), 1.39 (1035H, s), 1.08 (3107H, s); P8 $^1$H NMR (500 MHz, CDCl3) δ 6.51-6.64 (2H, m), 5.74-5.83 (1H, m), 5.48-5.62 (26H, m), 5.22-5.45 (239H, m), 4.83-5.00 (63H, m), 3.49 (8H, q), 3.06 (4H, t), 2.39 (4H, t), 2.32-2.36 (9H, m), 1.81-2.18 (538H, m), 1.37-1.47 (26H, m), 1.15-1.34 (50H, m), 0.89 (12H, d); P9 $^1$H NMR (500 MHz, CDCl3) δ 7.08-7.20 (4H, m), 6.72-6.80 (1H, m), 5.48-5.62 (26H, m), 5.22-5.45 (239H, m), 4.83-5.00 (63H, m), 3.54 (4H, q), 3.38-3.49 (8H, m), 2.98 (4H, t), 2.39 (4H, t), 2.30-2.37 (13H, m), 1.81-2.18 (538H, m), 1.37-1.47 (26H, m), 1.15-1.34 (50H, m), 0.85 (12H, d); and P10 $^1$H NMR (500 MHz, CDCl3, Phenol-d6) δ 5.48-5.62 (26H, m), 5.22-5.45 (239H, m), 4.83-5.00 (63H, m), 3.24-3.38 (16H, m), 3.38-3.49 (8H, m), 2.91 (4H, t), 2.24 (4H, t), 2.30-2.37 (13H, m), 1.81-2.18 (538H, m), 1.37-1.47 (26H, m), 1.15-1.34 (50H, m), 0.72 (12H, d).

Thermal characterizations of Example TPEs P1-P10 were carried out using differential scanning calorimetry (DSC) and thermal gravimetric analysis (TGA). For each experimental run, 5 mg of the polymer was used. All TGA samples were heated to 800° C. at a ramp rate of 10° C./min in air. All DSC samples were heated at a ramp rate of 10° C./min from −100° C. to 20° C. above the observed melting temperature and then cooled at 10° C./min to −100° C. This procedure was cycled twice on each sample. The results are summarized in Table 2, below. Overall, the Tg's of the soft middle block in Example TPEs P1-P10 fall in the expected range. As few as two β-alanine repeat units are necessary for effective microphase separation as demonstrated by the observed $T_m$ in Example TPEs P1-P3 due to the formation of the crystalline oligo(β-alanine) microdomains. The $T_m$ of the crystalline oligo(β-alanine) microdomains increases as with the number of β-alanine residue (z) in the oligo(β-alanine) segment under otherwise identical situations as shown by comparison of Example TPEs P5-P7 as well as comparison of Example TPEs P8-P10. In addition, the $T_m$ of the oligo (β-alanine) apparently decreases when the content of the soft middle "B" block increases with z being kept constant as shown by comparison of Example TPEs P1-P3. The capping group, R, at the end of the oligo(β-alanine) also apparently influences the $T_m$. Finally, a $T_m$ in Example TPE P4 was not observed. This is likely due to the fact that the peptide only account for 1 wt % in the sample, and the DSC instrument is not sensitive enough to detect the melt transition. As will be shown below in Example 8, Infra-red spectroscopy revealed that the oligo(β-alanine) still formed the β-sheet like structure.

TABLE 2

| Polymer | $T_g$ (° C.) | $T_m$ (° C.) | $T_d$ (° C.) |
|---|---|---|---|
| P1 | −58 | 182 | |
| P2 | −68 | 174 | |
| P3 | −66 | 86 | |
| P4 | −71 | NA | |
| P5 | −67 | 114 | 250 |
| P6 | −67 | 192 | 300 |
| P7 | −66 | 238 | 300 |
| P8 | −79 | 112 | 275 |
| P9 | −76 | 185 | 300 |
| P10 | −77 | 220 | 275 |

Example 8

Infra-Red Spectra for TPEs P1-P10

Figure 9:
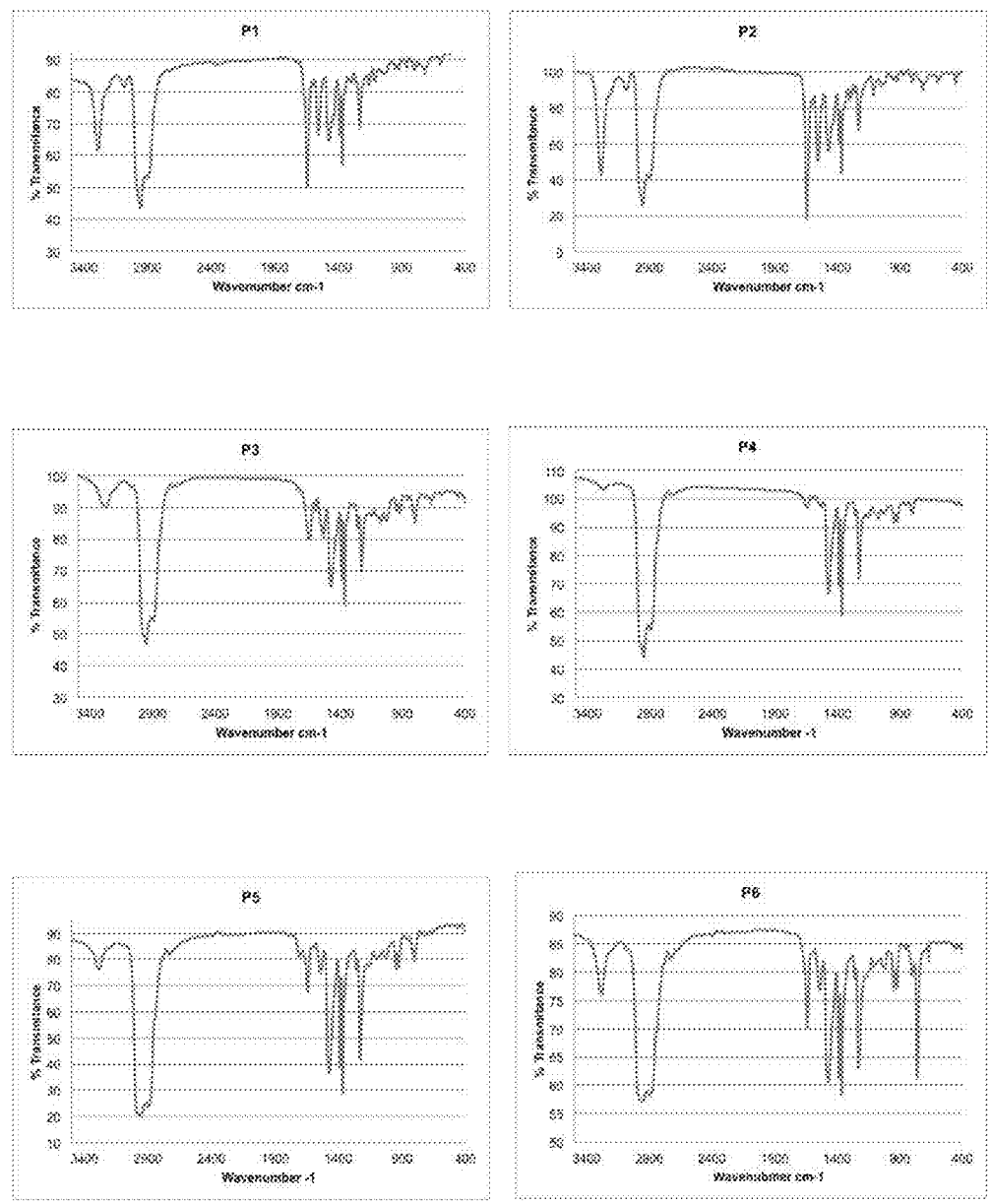
FIG. 9 is a collection of IR-Spectra for sample TPEs (P1-P10) prepared according to various embodiments of the present invention.
Figure 9:
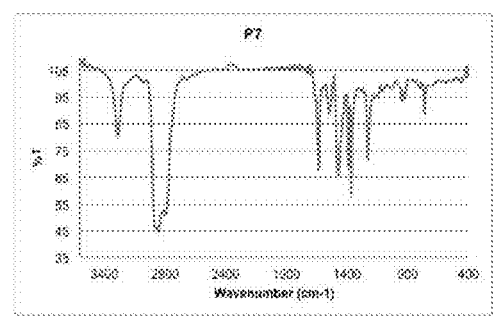
Figure 9:
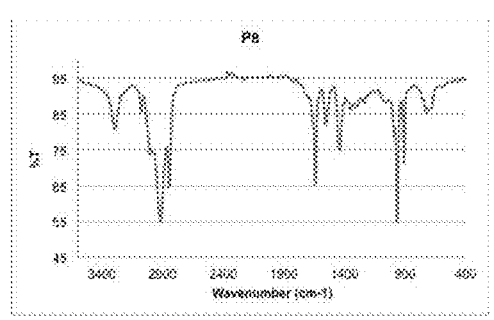
Figure 9:
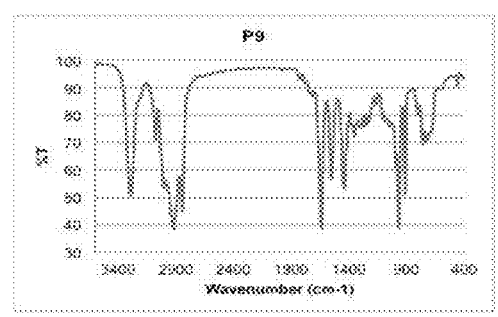
Figure 9:
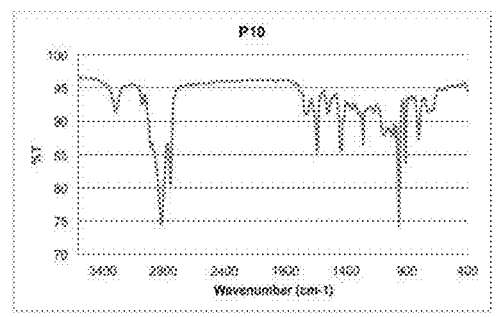

To prepare the sample for IR spectral analysis, a chloroform solution of Example TPEs P1-P10 was cast on a KBr pellet. The KBr pellet was dried in a vacuum oven at 60° C. overnight to completely remove the solvent. The IR spectra for polymers P1-P10 are shown in FIG. 9. The amide A, amide I, and amide II bands of the oligo(β-alanine)s are summarized in Table 3 below.

TABLE 3

| | IR Figures | | |
|---|---|---|---|
| Polymer | Amide A | Amide I | Amide II |
| P1 | 3288 | 1643 | 1555 |
| P2 | 3287 | 1643 | 1555 |
| P3 | 3275 | 1643 | 1536 |
| P4 | 3284 | 1636 | 1539 |
| P5 | 3284 | 1637 | 1541 |
| P6 | 3286 | 1637 | 1541 |
| P7 | 3289 | 1637 | 1541 |
| P8 | 3292 | 1639 | 1552 |
| P9 | 3292 | 1639 | 1552 |
| P10 | 3293 | 1639 | 1552 |

The IR spectra for Example TPEs P1-P10 (FIG. 9) display the N—H stretching vibration at <3300 cm$^{-1}$, indicating the hydrogen bonding of the amide functionalities play an important role in the physical crosslinking. The amide I and amide II bands are consistent with the formation of a β-sheet-like structure. (See *Chem. Commun.*, 2010, 46, 4273-4275, the disclosure of which is incorporated herein by reference in its entirety.)

Example 9

Dynamic Mechanical Analysis of TPEs P5-P7

Figure 11:
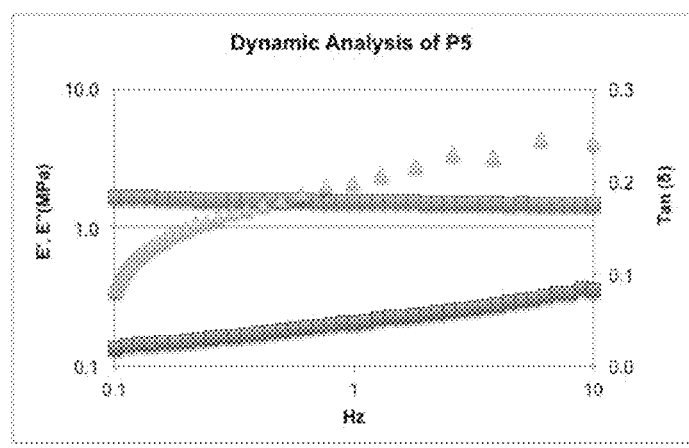
FIG. 11A is a graph showing the results of a dynamic mechanical analysis conducted on a sample TPE (P5) prepared according to one embodiment of the present invention.
FIG. 11B is a graph showing the results of a dynamic mechanical analysis conducted on a sample TPE (P6) prepared according to one embodiment of the present invention.
FIG. 11C is a graph showing the results of a dynamic mechanical analysis conducted on a sample TPE (P7) prepared according to one embodiment of the present invention.
Figure 11:
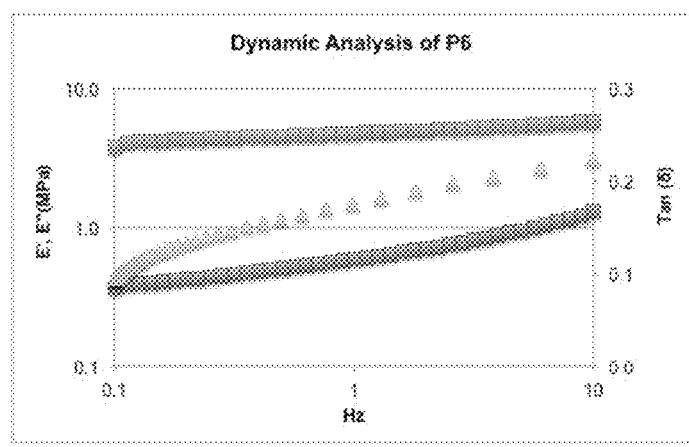
Figure 11:
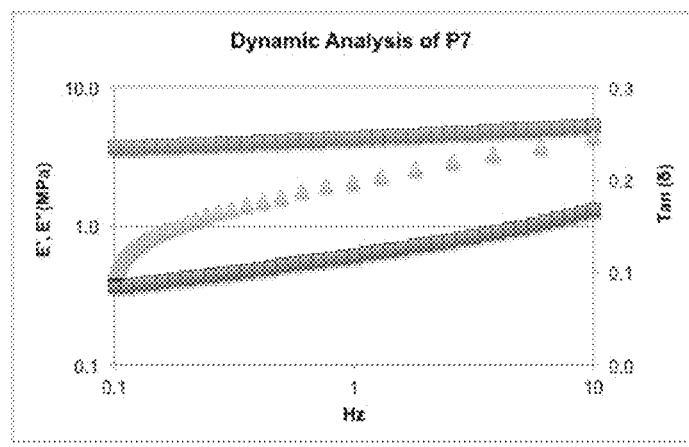

To prepare Example TPEs P5-P7 for stress strain analysis, the polymers were pressed in a hydraulic press at the melting temperature of the peptide domain at 3,000 lb of pressure for 8 min. The pressure was then bumped and then held at 15,000 lb of pressure for 2 min. The pressure was held and the temperature allowed to cool to 20° C. below the melting temperature. The resulting films were then cut into 20 mm×5 mm×1 mm strips. The dynamic storage and loss modulus were measured in tension mode at a 2.0% strain from 0.1 Hz to 10.0 Hz. The results are shown in FIG. 11. Note that substantial moduli are achieved with as little as 2.5 wt % of the peptide. This is in sharp contrast to conventional TPEs, where several tens of percent of a hard component such as polystyrene is required to achieve similar moduli.

Example 10

Stress/Strain of Example TPEs P5-P7 at Room Temperature

To prepare the TPEs for stress strain analysis samples of TPEs P5, P6, and P7 were pressed and annealed in a hydraulic press as described above in Example 9 and then died out into on 1 mm thick dog bone specimen using the ASTM D638 Type V die. These samples were strained at 1 mm/sec until failure. The results are shown in FIG. 10B.

Example 11

Stress Relaxation of Example TPEs P5-P7 at Room Temperature

To prepare them for stress strain analysis, Example TPEs P5-P7 were annealed in a hydraulic press as described above in Example 9 and cut into 20 mm×5 mm×1 mm strips. P5 and P6 were deformed 5% and held for 1500 min, and P7 was deformed 10% and held for 1500 min. The results are shown in FIG. 10A.

Example 12

Stress/Strain of Example TPEs P9 and P10 at Room Temperature

To prepare the TPEs for stress strain analysis samples of Example TPEs P9 and P10 were pressed and annealed in a hydraulic press as described above in Example 9 and then died out into on 1 mm thick dog bone specimen using the ASTM D638 Type V die. These samples were strained at 1 mm/sec until failure. The results are shown in FIG. 10A, 5C.

Example 13

TEM Images of Example TPE P6

Transmission electron micrograph (TEM) images of polymer P6 were taken on a FEI Tecnai F20ST instrument. The TEM specimens were prepared as follows. A chloroform solution (0.1 w %) of polymer P6 was prepared. One drop of the solution was placed on a carbon-coated Cu grid. The liquid on the grid was blotted away. The TEM image was taken at room temperature. A dilute specimen was prepared by dipping the specimen prepared as the above into clean chloroform a few times to dissolve away some of polymer P6 and a second TEM image was taken at room temperature. The TEM images are shown as FIGS. 13 A and 13 B.

What is claimed is:
1. A thermoplastic elastomer composition comprising a telechelic polymer having at least 2 functional ends and a monodispersed β-alanine peptide segment bound to each functional end.

2. The thermoplastic elastomer composition of claim 1 wherein said telechelic polymer is a star polymer having at least 3 functional ends.

3. The thermoplastic elastomer composition of claim 1 wherein said telechelic polymer has two functional ends such that said thermoplastic elastomer composition comprises an A-B-A tri-block copolymer wherein A is a monodispersed β-alanine peptide segment and B is an elastomeric polymer.

4. The thermoplastic elastomer composition of claim 1 wherein said monodispersed β-alanine peptide segment forms β-sheet or sheet secondary structures.

5. The thermoplastic elastomer composition of claim 3 wherein said A-B-A tri-block copolymer is linear.

6. The thermoplastic elastomer composition of claim 3 further comprising a plurality of A-B-A tri-block copolymer chains, wherein said plurality of A-B-A tri-block copolymer chains are physically crosslinked by hydrogen bonds formed between the monodispersed β-alanine peptide segments of said A-B-A tri-block copolymer chains.

7. The thermoplastic elastomer composition of claim 1 further comprising a plurality of polymer chains, wherein said plurality of polymer chains are physically crosslinked by hydrogen bonds formed between the monodispersed β-alanine peptide segments of said polymer chains.

8. The thermoplastic elastomer composition of claim 2 further comprising a plurality of star polymer chains, wherein said plurality of star polymer chains are physically crosslinked by hydrogen bonds formed between the peptide segments of said star polymer chains.

9. The thermoplastic elastomer composition of claim 1, wherein said monodispersed β-alanine peptide segments form crystalline domains.

10. The thermoplastic elastomer composition of claim 9 wherein said crystalline domains have a $T_m$ of from about 80° C. to about 260° C.

11. The thermoplastic elastomer composition of claim 1, wherein said monodispersed β-alanine peptide segment has from 2-10 β-alanine amino acid residues.

12. The thermoplastic elastomer composition of claim 1, wherein said monodispersed β-alanine peptide segments are from about 0.1 to about 14 weight percent of the thermoplastic elastomer composition.

13. The thermoplastic elastomer composition of claim 1, wherein said telechelic polymer comprises a polymer selected from the group consisting of polyisobutylene, polyisoprene, polybutadiene, poly(styrene-co-butadiene), poly(dimethylsiloxane), poly(ethylene-co-propylene), hydrogenated polybutadiene, hydrogenated polyisoprene, hydrogenated poly(styrene-co-butadiene), polystyrene, poly(methyl methacrylate), poly(ethyl methacrylate), poly(propyl methacrylate), poly(butyl methacrylate), poly(methyl acrylate), poly(ethyl acrylate), poly(propyl acrylate), poly(butyl acrylate), and any combinations or derivatives thereof.

14. A method for forming the thermoplastic elastomer composition of claim 1 comprising the steps of:
  A. providing a telechelic polymer having at least 2 functional end groups;
  B. providing a monodispersed β-alanine peptide having from 2 to 10 amino acid residues, wherein one end of said peptide is functionalized to chemically bond to said functional end groups;
  C. reacting said telechelic polymer with said peptide wherein said peptide chemically bonds to said functional end groups of said telechelic polymer to form peptide terminated polymer chains; and
  D. physically crosslinking said peptide terminated polymer chains wherein said peptide terminated polymer chains are crosslinked by hydrogen bonds formed between a plurality of the peptide segments of different peptide terminated polymer chains.

15. A method for physically crosslinking the thermoplastic elastomer composition of claim 1 comprising the steps of:
  A. providing a telechelic polymer having at least 2 functional end groups;
  B. providing a monodispersed β-alanine peptide having from 2 to 10 amino acid residues, wherein one end of said peptide is functionalized to chemically bond to said functional end groups;
  C. reacting said telechelic polymer with said peptide wherein said peptide chemically bonds to said functional end groups of said telechelic polymer to form peptide terminated polymer chains; and
  D. precipitating said peptide terminated polymer chains from solution thereby forming physical crosslinks between said peptide terminated polymer chains, wherein said peptide terminated polymer chains are crosslinked by hydrogen bonds formed between a plurality of the peptide segments of different peptide terminated polymer chains.

16. The thermoplastic elastomer of claim 1 having the formula:

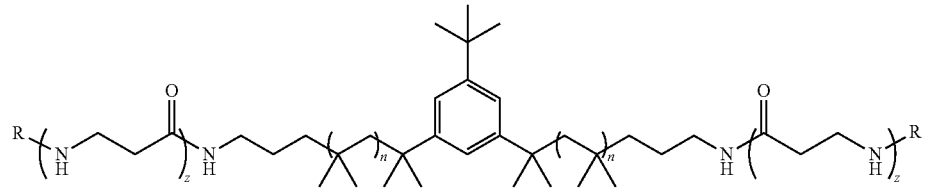

wherein n is a number average degree of polymerization of from 1 to 20,000; z is an integer from 2 to 10; and R is a hydrogen atom, an organic group, or inorganic group.

17. The thermoplastic elastomer of claim 16 wherein R is a hydrogen atom, an acetyl group or a toluoyl group.

18. The thermoplastic elastomer of claim 1 having the formula:

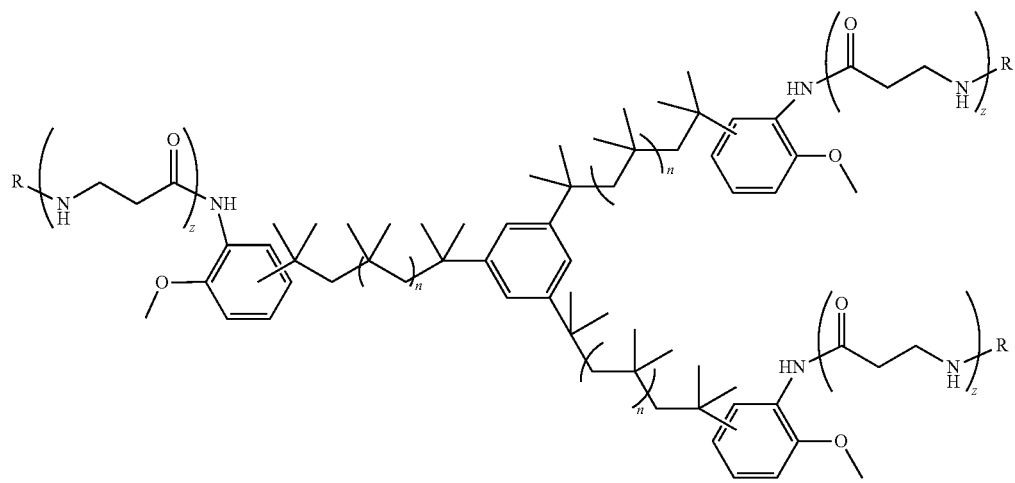

wherein n is a number average degree of polymerization of from 1 to 50,000; z is an integer from 2 to 10; and R is a hydrogen atom, an organic group, or inorganic group.

19. The thermoplastic elastomer of claim 1 having the formula:

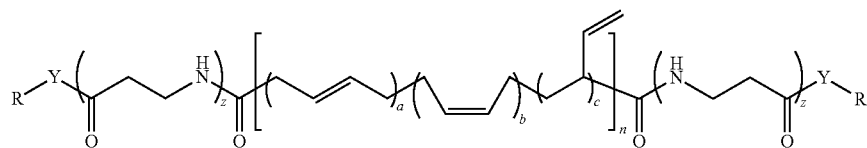

wherein a is the number fraction of the 1,4-trans-isomeric structure of butadiene from 0 to 1; b is the number fraction of the 1,4-cis-isomeric structure of butadiene from 0 to 1; c is the number fraction of 1,2-isomeric structure of butadiene from 0 to 1; a+b+c=1; n is a number average degree of polymerization of from 1 to 50,000; z is an integer from about 2 to about 10; Y is O or NH; and R is a hydrogen atom, an organic group or an inorganic group.

20. The thermoplastic elastomer of claim 19 wherein R is a hydrogen atom, an alkyl group or an aryl group, wherein a ratio of a:b:c in the polybutadiene is about 4:5:2, and wherein z is an integer from 2 to 6.

* * * * *